(12) United States Patent
Junker

(10) Patent No.: US 11,628,537 B2
(45) Date of Patent: Apr. 18, 2023

(54) METHOD AND DEVICE FOR GRINDING LARGE CRANKSHAFTS

(71) Applicant: ERWIN JUNKER GRINDING TECHNOLOGY A.S., Melnik (CZ)

(72) Inventor: Erwin Junker, Buehl/Baden (DE)

(73) Assignee: ERWIN JUNKER GRINDING TECHNOLOGY A.S., Melnik (CZ)

( * ) Notice: Subject to any disclaimer, the term of this patent is extended or adjusted under 35 U.S.C. 154(b) by 355 days.

(21) Appl. No.: 15/123,716

(22) PCT Filed: Mar. 13, 2015

(86) PCT No.: PCT/EP2015/055315
§ 371 (c)(1),
(2) Date: Sep. 6, 2016

(87) PCT Pub. No.: WO2015/136081
PCT Pub. Date: Sep. 17, 2015

(65) Prior Publication Data
US 2017/0014971 A1    Jan. 19, 2017

(30) Foreign Application Priority Data
Mar. 14, 2014    (DE) .................... 10 2014 204 807.9

(51) Int. Cl.
*B24B 49/04*    (2006.01)
*B24B 5/42*    (2006.01)
(Continued)

(52) U.S. Cl.
CPC ................ *B24B 49/04* (2013.01); *B24B 5/42* (2013.01); *B24B 49/02* (2013.01); *G05B 19/27* (2013.01); *G05B 2219/2627* (2013.01)

(58) Field of Classification Search
CPC ......... B24B 5/42; B24B 25/00; B24B 27/076; B24B 49/02; B24B 49/04
See application file for complete search history.

(56) References Cited

U.S. PATENT DOCUMENTS

| 3,271,910 A | * | 9/1966 | Haisch ..................... B24B 5/42 |
| | | | 451/1 |
| 4,637,144 A | * | 1/1987 | Schemel ................ B23Q 17/20 |
| | | | 33/501.03 |

(Continued)

FOREIGN PATENT DOCUMENTS

| DE | 4327807 C2 | 6/1995 |
| DE | 19650155 C1 | 6/1998 |

(Continued)

OTHER PUBLICATIONS

International Search Report for Application No. PCT/EP2015/055315, dated Jul. 3, 2015.

(Continued)

*Primary Examiner* — Orlando E Aviles
*Assistant Examiner* — Marcel T Dion
(74) *Attorney, Agent, or Firm* — Marshall, Gerstein & Borun LLP

(57) ABSTRACT

A grinding machine and a method for grinding large crankshafts are disclosed. During pre-grinding, steady-rest seats are ground, and a plurality of steady rests are placed against them. Synchronous electric drives drive the crankshaft at both ends. A desired shape is produced by interpolating motion of a first grinding disk about CNC-controlled X and Z axes and about a WK pivot axis. The grinding disk is a CBN grinding disk with a width less than the axial length of the main journals and crankpins of the crankshaft. Diameters are measured along the axial length of the main journals and/or crankpins by an in-process device. The drives for the X1, Z1, and WK axes are controlled in an interpolating manner on the basis of the measurements to achieve the desired shape.

24 Claims, 14 Drawing Sheets

(51) Int. Cl.
  *B24B 49/02* (2006.01)
  *G05B 19/27* (2006.01)

(56) References Cited

U.S. PATENT DOCUMENTS

| | | | |
|---|---|---|---|
| 5,681,208 A | 10/1997 | Junker | |
| 5,857,895 A * | 1/1999 | Falchieri | B24B 49/045 451/25 |
| 6,257,972 B1 * | 7/2001 | Lessway | B23Q 1/76 294/119.1 |
| 6,684,500 B1 | 2/2004 | Kohlhase et al. | |
| 6,878,043 B1 * | 4/2005 | Junker | B24B 5/42 451/249 |
| 6,926,591 B2 * | 8/2005 | Horsky | B24B 5/42 451/246 |
| 8,574,031 B2 † | 11/2013 | Dibner | |
| 2002/0166252 A1 * | 11/2002 | Dall'Aglio | B24B 5/42 33/555.3 |
| 2003/0139120 A1 | 7/2003 | Ito et al. | |
| 2006/0014473 A1 * | 1/2006 | Ammi | B24B 47/20 451/5 |
| 2008/0102736 A1 * | 5/2008 | Reim | B24B 5/42 451/49 |
| 2010/0081365 A1 | 4/2010 | Clewes et al. | |
| 2010/0173565 A1 | 7/2010 | Junker | |
| 2011/0003534 A1 * | 1/2011 | Himmelsbach | B24B 5/42 451/5 |
| 2011/0097971 A1 * | 4/2011 | Kumeno | B24B 5/04 451/5 |
| 2011/0237159 A1 * | 9/2011 | Araki | B23Q 17/20 451/5 |
| 2012/0003904 A1 | 1/2012 | Schmitz | |
| 2012/0252316 A1 * | 10/2012 | Stroppel | B24B 5/01 451/5 |
| 2014/0302751 A1 * | 10/2014 | Junker | B23Q 1/34 451/28 |

FOREIGN PATENT DOCUMENTS

| | | | |
|---|---|---|---|
| DE | 19650155 C1 † | 6/1998 | |
| DE | 19919893 A1 | 11/2000 | |
| DE | 19919893 A1 † | 11/2000 | |
| DE | 19749939 C2 | 10/2003 | |
| DE | 602005002993 T2 | 8/2008 | |
| DE | 102009051586 A1 | 4/2011 | |
| EP | 1193028 A2 | 4/2002 | |
| EP | 1044764 B1 | 7/2005 | |
| EP | 2570229 A2 | 3/2013 | |
| GB | 2413978 A † | 11/2005 | |
| GB | 2445025 A | 6/2008 | |
| JP | H02128102 A | 5/1990 | |
| JP | H07178666 A | 7/1995 | |
| JP | H10109268 A | 4/1998 | |
| JP | H11325876 A | 11/1999 | |
| JP | 2002124037 A | 4/2002 | |
| JP | 2003025196 A | 1/2003 | |
| JP | 2003103460 A | 4/2003 | |
| RU | 2112637 C1 | 6/1998 | |
| RU | 2470758 C2 | 12/2012 | |
| WO | WO-2004012903 A1 | 2/2004 | |
| WO | WO-2004033136 A1 | 4/2004 | |
| WO | WO-2005110676 A1 | 11/2005 | |
| WO | WO-2011085913 A1 | 7/2011 | |
| WO | 2012126840 A1 † | 9/2012 | |
| WO | WO-2012126840 A1 | 9/2012 | |

OTHER PUBLICATIONS

Fives Landis, "LT3 Large Orbital Grinding Machine," 2 pages, Nov. 6, 2009, retrieved Apr. 12, 2017, URL: https://web.archive.org/web/20091106021143/http://www.cinetic-landis.co.uk/de/lt3.php.†

Zdenek Brychta, "Komplett in einer Aufspannung schleifen," Werkstatt und Betrieb, 3 pages, May 1, 1999, Carl Hanser Verlag, Munchen.†

\* cited by examiner
† cited by third party

Fig. 11
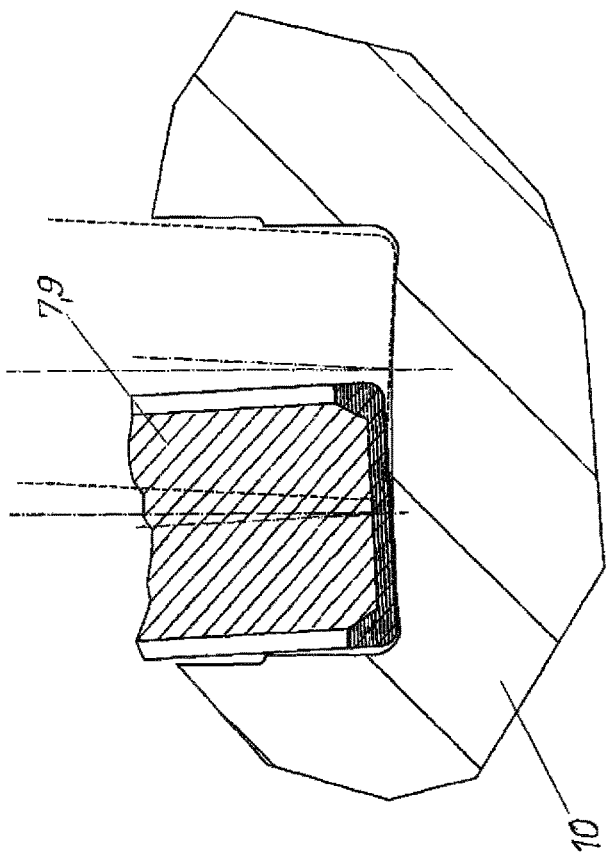
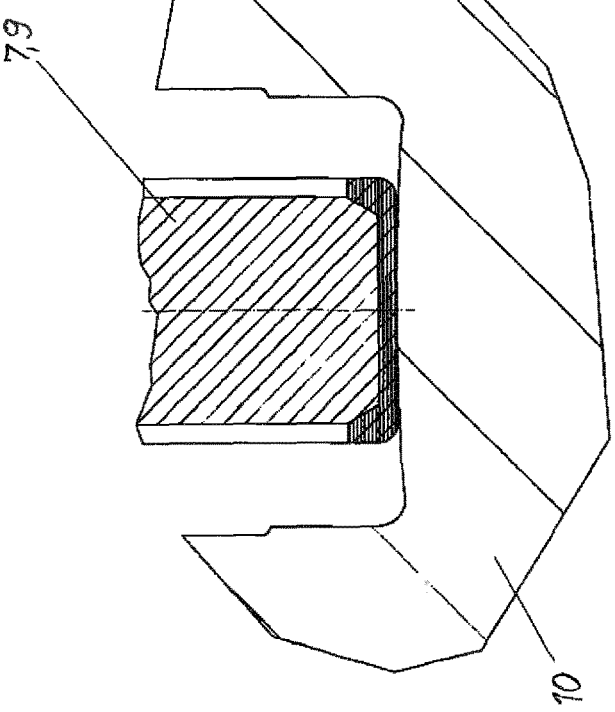

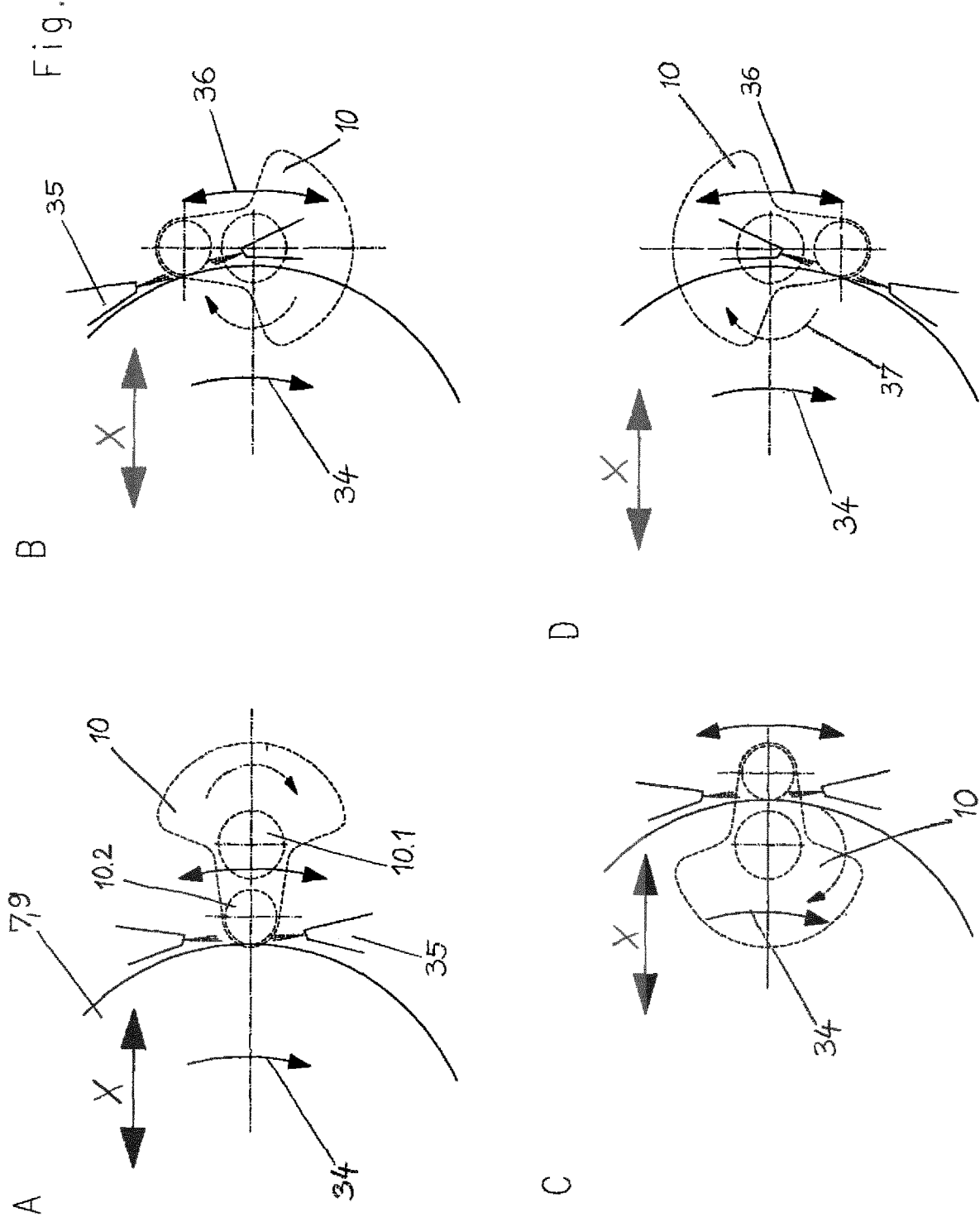

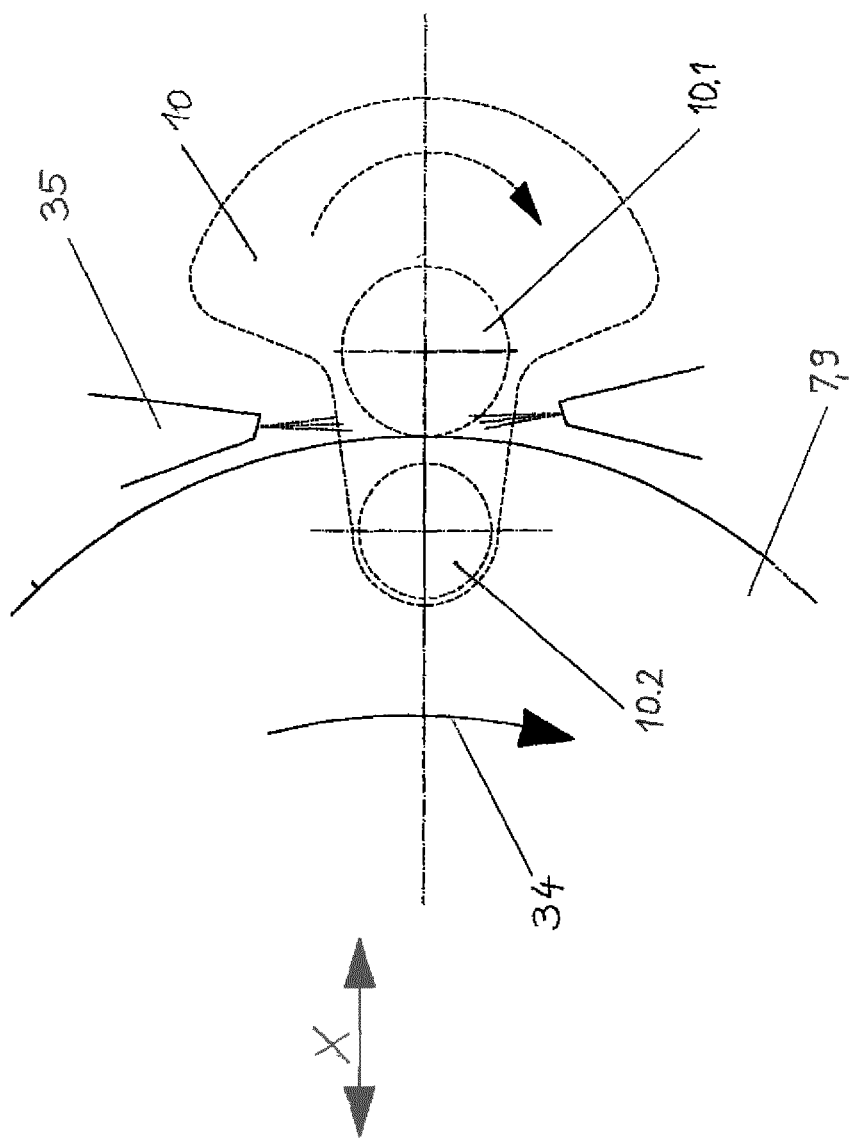

METHOD AND DEVICE FOR GRINDING LARGE CRANKSHAFTS

CROSS-REFERENCE TO RELATED APPLICATIONS

This is the United States national phase of International Patent Application No. PCT/EP/2015/055315, filed Mar. 13, 2015, which claims the priority benefit of German Application No. 10 2014 204 807.9, filed Mar. 14, 2014. Each of the foregoing is expressly incorporated herein by reference in the entirety.

BACKGROUND

The invention relates to a method and a device for the grinding machining of large crankshafts of truck engines, ship engines or stationary engines.

Within the scope of this invention, large crankshafts are intended to be crankshafts which have a length of >800 mm, in particular 1000 to approx. 4000 mm. Unlike in the case of passenger vehicle crankshafts, large crankshafts of this type are not produced in piece numbers of identical size. The larger the crankshaft dimensions, the smaller are the batch sizes in which the crankshafts are produced.

Grinding machines which are provided for machining crankshafts, for example with a length of approx. 1500 mm, are generally loaded and unloaded manually by means of loading aids. Because of the small piece numbers of crankshafts of this order of magnitude and the fact that, for large crankshafts of this type, grinding oversizes of up to 2 mm in diameter and of up to 0.5 mm per side on the flat sides have to be ground and therefore even the unmachined parts which pass to the grinding machine are highly cost-intensive, although the focus even for these large crankshafts is on the grinding times being particularly short, it is nevertheless of significant importance for the unmachined crankshaft parts to be ground as parts of acceptable quality. This means that, under all circumstances, rejects have to be avoided because of the high financial loss. Increased grinding times are sooner accepted than a poor grinding result qualifying the crankshaft as a reject part. It should be noted here that, during the grinding of large crankshafts, the higher grinding oversize that is also required because of the preliminary soft machining treatment and subsequent hardening of the bearing points requires a high material removal rate, which, for its part, contains the risk of the crankshaft being distorted during the grinding. This effect or this disadvantage occurs all the more severely if the flat sides of the bearing points have to be co-ground. Above all, the transition radii present between the bearing points and the flat sides to be co-ground in the case of the large crankshafts further exacerbate this problem. After the hardening of the individual bearing points, the hardening zone customarily extends into the radius transition or possibly even into the adjacent flat shoulder. During the grinding of large crankshafts, a substantially greater distortion should therefore be anticipated than in the case of smaller crankshafts, for example passenger vehicle crankshafts. It is generally not possible readily to transfer the grinding sequences and grinding conditions which are successful for smaller crankshafts in order to produce crankshafts of this type with high accuracy to large crankshafts. Large crankshafts are customarily produced on large grinding machines in a plurality of process steps, wherein the grinding is customarily carried out with corundum grinding wheels.

DE 43 27807 C2 describes a method and a grinding machine for grinding a crankshaft without having focus specifically on large crankshafts. In the known method, the crankshaft is clamped with axial tension and is ground by at least two contoured grinding wheels which are each mounted separately. The crankshaft clamped in a work headstock and a footstock is set into rotation by the drive in the work headstock. The accuracy of the ground crankshaft is intended to be achieved by the fact that the entire finish-grinding of the crankshaft, but only the finish-grinding, is realized in a single setup. There is no information regarding the use of steady rests.

DE 199 19893 A1 describes the rough-grinding and finish-grinding of a crankshaft in a setup. In particular, reference is made to larger crankshafts, for example also for truck engines, with a length of more than 300 mm. A steady rest seat is also provided at least on a main bearing because of the longer crankshafts. The grinding wheels used may be CBN grinding wheels and also corundum grinding wheels, wherein reference is made to the fact that, when CBN grinding wheels are used, the service life of a grinding wheel is longer and greater accuracy can also be achieved. Both the work headstock and the footstock can have a dedicated drive, which drives run synchronously with respect to each other. Furthermore, it is pointed out that, in a single setup, at least the main bearings of the crankshaft can be rough-ground and then the crank pin bearings thereof and subsequently the main bearings thereof can be finish-ground with the at least one grinding wheel. If the bearing surface is intended to have a convex shape, this is possible via appropriate dressing of the grinding wheel used, specifically without rechucking being necessary. The grinding of the cylindrical end sections and of the flanges of the crankshaft is not described, especially since, with the described method, the clamping jaws of a chuck act on the cylindrical journal end of the crankshaft.

The Internet printout from Cinetic Landis describes a large CNC crank pin bearing grinding machine with the designation LT3. This machine is described up to a size of 8 m. It is used to grind crank pin bearings and main bearings using an in-process measurement. In order in particular to be able to grind radii in the transition from the actual bearing surfaces to the end faces on the cheeks bounding the bearings, a CNC grinding wheel dresser is present. The known machine grinds the main bearings and the crank pin bearings in a setup and is furthermore capable of grinding the cylindrical end regions, including bevels or conical sections. Reference is also made to servo-controlled steady rests.

Furthermore, the company brochure from Ingersoll Naxos with regard to the machine data of the CBN crank pin bearing grinding machine PQ500x1250 relates firstly to a workpiece length of 1500 mm for a crankshaft to be ground and secondly to the use of CBN grinding wheels. The machine is coupled to an in-process diameter measurement device.

With the widespread use of corundum grinding wheels for large crankshafts, it is required above all, at a bearing point, during the grinding of the radii in the transition from the actual bearing point to the flat sides of the cheeks, and also when grinding the cheeks, that the grinding wheel grinding the radii has to be dressed beforehand. If the grinding wheel has to be used subsequently for the grinding, for example, of the bearing point or of the cylindrical end sections of the crankshaft, it has to be dressed again. Generally, a corundum grinding wheel has to be dressed frequently between the individual different working steps. Since the costs for corundum grinding wheels are relatively low, this is accepted. The frequent dressing between the individual working steps also requires an overall longer production time for a large crankshaft, which also is entirely accepted if it can therefore at any rate be avoided that a large crankshaft is formed as a reject.

The in-process measurement devices known in the prior art are provided for measuring a current diameter at a bearing point in order thus to influence during the grinding that a desired diameter is achieved or maintained.

GENERAL DESCRIPTION

By contrast, it is the object of the invention to provide a method and a grinding machine with which large crankshafts of truck engines, ship engines or stationary engines can be ground with great accuracy and high efficiency and with which grinding wheels with a long service life can be used and the number of dressing operations can be reduced.

Expedient developments are described in the respective dependent claims.

According to a first aspect of the invention, in the case of the method according to the invention for completely grinding large crankshafts, at least all of the main bearings and crank pin bearings of the crank shaft are rough-ground and finish-ground with at least one first CBN grinding wheel. In addition, at least all of the cylindrical end regions and flanges of the crankshaft are likewise rough-ground and finish-ground in the single setup of the crankshaft. The use of a CBN grinding wheel permits a long service life and grinding with high accuracy without the grinding wheel having to be dressed after each grinding operation of a certain working cycle. During the rough-grinding of the crankshaft, steady rest seats, generally a plurality thereof, are ground, and one steady rest is lined up with each of the ground steady rest seats. The number of steady rests used depends on the size and the length of the crankshaft to be ground. In the case of shorter crankshafts, two steady rests are sufficient in some circumstances, and therefore also only two steady rest seats have to be ground. In the case of larger and longer crankshafts, it is entirely necessary and customary to grind a steady rest seat on each main bearing and to line up a corresponding steady rest.

The more steady rests are used and the longer the crankshaft is, the greater the problem can be of torsion of the crankshaft during its rotation which is performed by a drive of the work headstock. A rotational drive of this type is denoted by C1. In order to avoid the torsion, a rotation drive C2 is likewise provided according to the invention on a second work headstock arranged at an end opposite the work headstock. The two drives C1 and C2 are operating synchronously with respect to each other electrically.

According to the invention, the first grinding wheel is driven with respective CNC-controlled X1, Z1 and WK1 axes. The first grinding wheel has a width which is smaller than the axial length of the main bearings and crank pin bearings of the crankshaft. The desired shape of the lateral surface of the crank pin bearings and/or main bearings is produced by interpolating movement of the first grinding wheel about its X1, Z1 and/or WK1 axis. Within the context of the invention, lateral surface is intended to be understood here as meaning the lateral surface of the actual bearing of the crankshaft and also the transition from the lateral surface by means of a defined radius into the flat surface arranged perpendicularly to the longitudinal axis of the bearing point, on the cheeks bounding a bearing point. The X1 axis here constitutes the infeed of the grinding wheel perpendicularly to the longitudinal axis of the bearing point in an advancing direction. The Z1 axis constitutes the movement axis of the grinding wheel with its axis parallel to the longitudinal axis of the bearing point. And the WK1 axis constitutes a pivot axis by means of which the grinding wheel is moved at a changeable angle with respect to its longitudinal axis. That is to say, the WK1 axis constitutes a pivot axis which runs perpendicularly to the longitudinal axis of the crankshaft through the grinding wheel and the engagement point of the grinding wheel on the workpiece to be ground. An exact, high-quality, cylindrical shape of a bearing point can be achieved only if the grinding wheel, which is otherwise formed flat at its circumference in the grinding engagement line, can be pivoted about this very WK1 axis.

According to the invention, it is now furthermore provided that at least two, preferably a plurality of, current diameters are measured by means of a measurement device during the grinding of the main bearings and/or crank pin bearings or in the event of interrupted grinding of same, specifically at measurement locations spaced apart along the axial length of said bearings; on the basis of these measurement results, the X1, Z1 and WK1 axes of the first CBN grinding wheel are controlled in an interpolating manner with regard to each other and depending on one another in order to achieve a desired contour of the lateral surface of the main bearings and/or crank pin bearings of the crankshaft. Interrupted grinding is understood here as meaning that the grinding wheel is not in engagement.

In principle, the large crankshaft can be ground with a single grinding wheel which is mounted on a single grinding headstock. Said grinding wheel has only to be narrow enough in order not only to be able to grind the main bearings and the crank pin bearings of the crankshaft, but also the cylindrical end sections and also the flanges and flat sides on the bearings and the radii in the transition from the actual bearing surfaces to the flat sides of the bearings. For efficiency reasons, it is entirely advantageous if two grinding headstocks are present and if a corresponding grinding wheel is present on each grinding headstock. As a result, it is possible to considerably reduce the grinding time for the crankshaft. By means of the movement, which is executed in an interpolating manner, of the grinding wheel about its X1, Z1 and WK1 axis, it is now possible for radii of different dimensions to be able to be ground by means of the CBN grinding wheel without respective dressing operations. That is to say, the radii to be ground can be copied directly by the grinding wheel without dressing of the latter. This constitutes a decisive time and accuracy advantage in comparison to corundum grinding wheels.

However, in the transition to the flat surfaces arranged perpendicularly to the longitudinal axis of the respective bearing points, it is also necessary for the WK1 axis of the grinding wheel to have to be activated in order to be able to merge from the diameter grinding on the bearing surfaces and adjoining radii to a flat surface arranged perpendicularly thereto.

With the method according to the invention, it is therefore possible to grind a large crankshaft in a single setup with high accuracy and with a long service life of the grinding wheel used and therefore with high efficiency.

The first grinding wheel is preferably dressed at defined intervals between the grinding machining of the crankshaft. A substantial advantage of the CBN grinding wheel consists specifically in that, for example, considerably more grinding operations can be carried out without the grinding wheel having to be dressed. Dressing is at any rate not required for the purpose of achieving a certain contour because the high degree of flexibility of use of all three CNC-controlled axes of the grinding wheel permits the production of any contour and also, for example, a cylindrical contour with high accuracy without dressing being required each time for this purpose. Dressing at any rate is preferably undertaken only whenever a certain degree of wear on the grinding wheel has to be compensated for, but not for achieving a profiling at the grinding wheel.

The length dimensions of the crankshaft are preferably also measured and, in order to control the grinding position at least of the first grinding wheel, are transmitted to the CNC controller thereof for the X1 and Z1 axis. As a result, it is possible to bring the grinding wheel exactly to the grinding position, by means of which the axial length dimension to be ground can be kept to.

According to a development of the invention, the X1, Z1 and WK1 axes at least of the first grinding wheel are controlled in such a manner that a desired shape deviating from the cylindrical shape of the main bearings and/or crank pin bearings is produced. With the method according to the invention, it is furthermore possible that, by means of a corresponding number of measurement planes for determining the current diameter at different positions along the longitudinal axis of the respective bearing, a highly accurate cylindrical shape can be achieved which is not possible, or at any rate is possible only to a limited extent, in the case of the in-process measurement devices used according to the prior art because a measurement is to this extent always only undertaken at a single point of a bearing region.

Furthermore preferably, for the grinding of a cylindrical end region and/or flange of the crankshaft, a chuck on a work headstock at an end region of the crankshaft or on a footstock on an opposite end region of the crankshaft, or instead of the footstock, on a second work headstock of said end region is released, and the crankshaft is then held centrally by respectively provided points of the respective chuck. In the event of, for example, light pressure of the points against the centering bore of the crankshaft via the respective chuck, the crankshaft can furthermore also be driven. When a chuck is released, it is at any rate possible for an end region of the crankshaft to be able to be ground, specifically rough-ground and finish-ground, by means of the at least first grinding wheel. An analogous procedure is undertaken at the opposite end region of the crankshaft. It is therefore possible to completely grind a large crankshaft with high efficiency and accuracy in a single setup.

According to a development, in the method according to the invention a second CBN grinding wheel is provided which carries out the rough-grinding and finish-grinding of the crankshaft by means of its CNC-controlled X2 and Z2 axis drives and an additional CNC-controlled drive in a WK2 pivot axis. By means of the provision of two separate CBN grinding wheels, which are mounted on respective grinding headstocks, the manufacturing time for a large crankshaft can be reduced, possibly even halved.

In order, in the case of particularly long crankshafts, to compensate for a deformation during the machining as a result of introducing grinding forces during the grinding, at least four steady rest seats, with which corresponding steady rests can then be lined up, should furthermore preferably be ground.

The end regions of the crankshaft are preferably ground with the first grinding wheel, wherein it is also possible for the end region of one side of the crankshaft to be ground with the first grinding wheel and the opposite end region of the crankshaft to be ground with a second grinding wheel, wherein the second grinding wheel is also dressed at defined intervals. The length of the defined intervals can be determined under analogous aspects, as has also been described above for the first grinding wheel.

Radii of the lateral surface contour of the crankshaft are preferably also ground, in particular at the bearing points thereof, by direct copying, by means of the CBN grinding wheels, specifically without a preceding dressing of the grinding wheels to the precise radius value being required.

Since, with the complete grinding or complete machining of the large crankshaft in a single setup, loading/unloading which is otherwise required between the individual machining steps is superfluous, the disadvantage which would arise when carrying out the machining in a plurality of different grinding stations, namely that the crankshaft changes thermally during external measurements until said crankshaft is loaded again into the next grinding machine or grinding station, is avoided. Apart therefrom, for large crankshafts, there is always a considerable apparatus outlay in order to load or unload said heavy crankshafts.

In the case of the previously described use of two grinding headstocks, it is possible, in addition to the at least partially realized parallel machining during the rough-grinding and/or finish-grinding of the crankshafts, to use two differently contoured grinding wheels. The latter has the advantage that the grinding wheels can each be better adapted to the respective machining task at the individual bearing points or optimized thereto.

For the grinding of the large crankshafts, the following different technologies or working sequences during the grinding of the bearing points or of the cylindrical end regions and flanges that are to be ground are intended to be used:

a) rough-grinding and finish-grinding of main bearings and crank pin bearings with or without transition radii and/or flat sides;

b) rough-grinding and finish-grinding of a thrust bearing on its flat sides bounding the actual bearing point;

c) grinding transition radii at the bearing points at the transition to the flat sides with the possibility of radius interpolation at main bearings and/or crank pin bearings and at the thrust bearing, wherein the radii at the transitions from diameter at the bearing points to the flat sides thereof are ground with a grinding wheel having a radius at its "corner". Since the radii at the bearing transitions in many crankshafts are not identical in design at the main bearings and crank pin bearings, a smaller radius is dressed at the grinding wheel and this radius is then "copied" at the bearing point (see FIG. 11);

d) grinding the end regions of the crankshaft, such as flange and/or journal machining, wherein, because of the additional WK axis of the grinding wheels, there is also the possibility of grinding conical shaft ends;

e) grinding the front end surfaces on the journals and/or journal ends;

f) carrying out the grinding only with CBN grinding wheels; and g) using grinding oil or grinding emulsion as cooling lubricant.

An in-process measurement with a measurement device is first of all used for the main bearings and the crank pin bearings, wherein the measurement device used is movable over the grinding wheel width in the longitudinal direction of the bearing point in such a manner, and therefore measurement values for the diameter can be recorded at a plurality of points in the longitudinal direction of the bearing point, that it is possible also to measure the deviation from cylindricity, conicity or convexity at each bearing point. Furthermore, it is also possible, with said measurement device, to measure not only respective diameters at the bearing point, but also automatically to sense the roundness thereof. The measurement values are input according to the invention into the corresponding control devices of the machine, and therefore, with appropriate corrections during the grinding process, the contour achieved on the workpiece can be corrected and the desired contour can be obtained, specifically without the crankshaft having to be removed from the machine and measured in a special measurement room with special measurement apparatuses. A post-process measurement at the bearing points can also be undertaken with the measurement device which is present. For this purpose, the grinding wheel is infed up to a small radial distance from the bearing points, and the measurement device can then measure the diameter in the post-process measurement method. After this measurement method, it is likewise possible also to measure the deviation from the cylindricity, conicity or convexity at each bearing point.

In addition to the measurement of diameter and roundness, a device is also provided for measuring the longitudinal positioning of the crankshaft, wherein a precision measurement head is provided in each case on the grinding headstock or on the grinding headstocks. It is therefore possible to automatically measure length dimensions on the crankshaft. A what is referred to as switching measurement head is used as the measurement head, that is to say, the key head deflects upon contact with the workpiece by movement of the grinding headstock along the Z axis thereof until an electric switching signal is output. Said switching signal is then allocated to the position value of the length measurement apparatus of the Z axis. By repeated measurement of defined or all of the flat sides of the bearing points, the precise longitudinal position can therefore be determined for each bearing point prior to the grinding, and therefore, firstly, the grinding oversize for each flat side which has to be ground can be precisely measured and therefore also determined. As a result, the grinding time can be optimized because what is referred to as "air grinding" can be eliminated. According to this principle, radial positions on the crankshaft can also be determined with the same measurement head. The measured radial positions are then also allocated here to the C axes of the work headstocks.

The complete machining of a large crankshaft in a single setup is also especially of importance because a large crankshaft having, for example, a length of approx. 2500 mm requires a grinding time of approx. two hours.

According to a second aspect of the invention, a grinding machine for completely machining large crankshafts of truck engines, ship engines or stationary engines is provided, in which at least the following elements are arranged on its machine bed:

a) A first and a second work headstock having a respective CNC-controlled rotary drive C1 and C2. The crankshaft to be ground is clamped between the work headstocks. This setup is retained during the entire complete grinding machining of the crankshaft, and therefore rechucking operations are not required. The rotary drives C1 and C2 drive the crankshaft at its two ends synchronously with respect to each other. They therefore ensure what is referred to as an electric wave. By means of the synchronous drive of the two rotary drives C1 and C2, it is ensured that the crankshaft is not twisted during its rotation. Because of the relatively large lengths of the large crankshafts machined with the grinding machine according to the invention, said large crankshafts have to be supported on a plurality of main bearings, more preferably on all of the main bearings. As a result, frictional moments are exerted on the crankshaft and, for their part, lead to torsional loading. In order to avoid this torsional loading or to counteract same, the rotary drives C1 and C2 are arranged at both ends of the crankshaft and operate synchronously with respect to each other.

b) Supports on main bearings of the crankshaft, which supports are ensured by a number of steady rests which are movable up to the respective crankshaft main bearings in a manner contacting the latter after a respective steady rest seat has been ground with a first grinding wheel arranged on a first grinding headstock.

c) The first grinding headstock with the first grinding wheel, wherein said grinding wheel is a CBN grinding wheel and has CNC-controlled drives of its X1 and Z1 axes for the rough-grinding and finish-grinding at least of main bearings and crank pin bearings of the crankshaft. Furthermore, a further CNC-controlled drive for a WK1 pivot axis is provided for said first grinding wheel, wherein the X1, Z1 and WK1 axes can be interpolated with respect to one another and are controllable in dependence on one another in such a manner that a desired lateral surface contour at least of the main bearings and crank pin bearings can be achieved.

d) A measurement device which is arranged on the grinding headstock and has a displacement axis which runs parallel to the longitudinal axis of the main bearings or crank pin bearings and along which the measurement device can be brought into measurement positions at which current diameters can be recorded by the measurement device. On the basis of said measured current diameters, the X1, Z1 and WK1 axes of the first grinding wheel are controllable in order to achieve a desired contour.

In particular for large crankshafts, the grinding spindles also have to be dimensioned to be of an appropriate size and weight. Although the moving of said large masses requires large drives, these drives have to run in a play-free and extremely low-friction manner for a highly precise surface or a highly precise desired lateral surface contour, in particular on the bearings of a crankshaft of this type. The substantial advantage of the additional WK axis of the grinding wheels consists in that the grinding wheels moved therewith can be obliquely positioned about relatively small angular amounts with little inertia and with a high degree of accuracy in order therefore to achieve reliable and cost-effective grinding of either curved and/or inclined workpiece contours or to be able to compensate for errors, i.e. deviations from the cylindrical desired contour. The WK axis is therefore deflected in a precisely adjustable manner by its associated drive, and therefore the grinding wheel is correspondingly slightly obliquely positioned in relation to the starting position. This pivot axis is substantially play-free in its pivoting function. With the grinding machine according to the invention, it is therefore possible, even with grinding wheels dressed in a flat manner, to grind the what is referred to as "ballus" on the corresponding bearing. With the X and Z axes for the movement of the grinding wheel, a horizontal reference plane is defined, as is present in the case of the customary round/unround universal grinding machines. A requirement for grinding a precise cylindrical contour is for the main bearings and/or the crank pin bearings to be clamped precisely axially parallel. Due to frequently unavoidable clamping errors and due to the fact that large crankshafts constitute relatively soft structures and despite all care during the grinding cannot be mounted in such a manner that the center axes of the clamping and supporting elements of all of the main bearings run in a precisely aligned manner with respect to the longitudinal axis of the crankshaft, and therefore small deviations from the desired contour arise, it is possible, by means of the additional WK axis for the grinding wheel, to counteract said errors and to achieve a therefore more precise desired contour specifically in the case of large crankshafts. Furthermore, with said additional WK pivot axis, the possibility is provided of also producing a convex circumferential surface on the respective bearing to be ground. An outwardly curved convex contour can also be achieved with a narrow grinding wheel if the latter can be positioned obliquely toward both sides, i.e. can be pivoted. It is therefore no longer required to produce a profiled grinding wheel which is present in accordance with the desired convex contour of a bearing and which reaches over the entire bearing width with its thickness, i.e. the grinding wheel width.

The work headstocks acting on both ends of the crankshaft and clamping the latter at the end regions are in particular movable hydraulically. The hydraulic movability permits an exact and readily positionable setting, and therefore the crankshaft can be optimally clamped at its ends.

The second grinding headstock preferably has a second grinding wheel which is likewise a CBN grinding wheel and is provided with CNC-controlled X2 and Z2 axes for the rough-grinding and finish-grinding of the crankshaft. Said second grinding wheel preferably likewise has an additional CNC-controlled drive for a WK2 pivot axis. Said WK2 pivot axis of the second grinding wheel has the same function and is constructed analogously to the WK1 pivot axis for the first grinding wheel.

Since, due to wear, the CBN grinding wheels have to be occasionally dressed, but not after each grinding operation, as is the case for corundum grinding wheels, the grinding machine preferably furthermore has a dressing device with a diamond dressing wheel, by means of which the first and the second grinding wheel can be dressed to their respective grinding wheel desired contour.

For the exact grinding of the flat surfaces of the flanges on the end regions of the crankshaft and also of the flat sides on the crankshaft cheeks bounding a respective bearing surface, a length measurement device is furthermore preferably arranged on one or both grinding headstocks, which length measurement device is movable along the Z axis into different measurement positions and by means of which the second grinding wheel is controllable at its grinding location in order to grind the respective flat surfaces on the crankshaft. High accuracy of the flat surfaces of the crankshaft with respect to one another can therefore also be achieved. The length measurement device preferably has a switching measurement head.

Furthermore preferably, the grinding machine has a plurality of steady rests, at least four steady rests. The steady rest holders are mounted movably on the grinding table such that they can be moved up to the respective bearing point after corresponding steady rest seats have been ground there. It is therefore possible reliably to support the crankshaft along its longitudinal direction in order to prevent the crankshaft from sagging during the machining, i.e. in order also to absorb the grinding forces introduced into the crankshaft by the grinding wheels during the grinding.

During the entire complete grinding machining of the crankshaft, the rotary drives C1 and C2 remain in a position clamping the crankshaft. This is firstly achieved during the grinding of the main bearings and of the crank pin bearings by corresponding chucks with clamping jaws which act on the outer cylindrical end regions of the crankshaft. When said end regions are also ground in the sense of complete machining of the crankshaft, the clamping jaws of the respective chucks have to be released and retracted. So that the crankshaft does not have to be rechucked, the chucks have tips which are coupled to the rotary drives C1 and C2, are driven with the latter, engage in centering bores in the crankshaft at the cylindrical end regions and thereby clamp the crankshaft, rotating the latter in a rotatory manner, between the tips.

In order, during the grinding of the crank pin bearings, to ensure a reliable supply of cooling lubricant/grinding oil to the grinding points on the crank pin bearings, which grinding points move eccentrically, i.e. revolve on an orbital path, a device is furthermore provided with an additional CNC drive for guiding the cooling nozzles, specifically such that the cooling nozzles remain substantially equidistantly from said grinding points during the eccentric revolving of the grinding point, and therefore cooling lubricant is reliably supplied at approximately the same distance to the grinding point.

BRIEF DESCRIPTION OF THE DRAWINGS

Further features, advantages and use possibilities of the invention will now be described in detail with reference to the drawing below. In the drawing:

FIG. 11 shows grinding of a convex bearing contour using the additional pivot axes WK1 and WK2 in comparison to grinding just with the X and Z axes;

FIG. 13 shows a schematic illustration of the guiding of the cooling nozzles during the grinding of the eccentrically revolving crank pin bearings; and FIG. 14 shows a schematic illustration of cooling nozzles arranged in a substantially stationary manner during the grinding of the main bearings.

DETAILED DESCRIPTION

Figure 1:
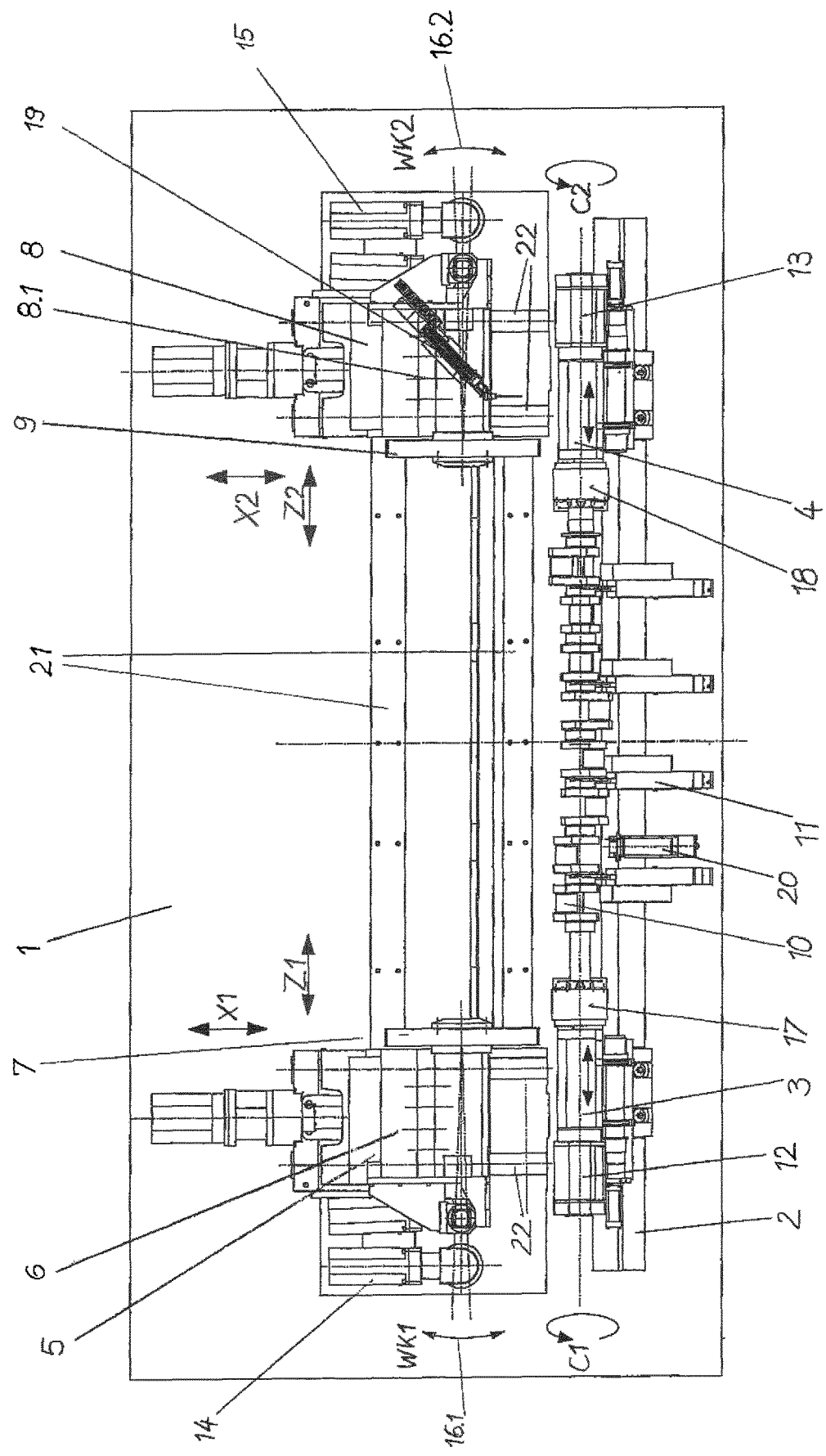
FIG. 1 shows a top view of the grinding machine according to the invention.

FIG. 1 shows the basic design of the grinding machine according to the invention on which large crankshafts can be machined. In a customary manner, the grinding machine is arranged on a machine bed 1 which accommodates all of the required assemblies. A first grinding headstock 5, which bears a grinding spindle 6 with a first CBN grinding wheel 7, is arranged in the rear region of the machine bed 1. Also arranged is a second grinding headstock 8 which bears a grinding spindle 8.1 with a second grinding wheel 9. Each grinding headstock 5, 8 is constructed on a cross slide which in each case has a controlled X and Z axis. Via said axes, the first grinding wheel 7 is therefore driveably movable via its X1 and Z1 axis and the second grinding wheel 9 is driveably movable via its X2 and Z2 axis. Furthermore, each of the grinding headstocks 5, 8 has, in each case on the grinding spindle unit thereof, what is referred to as a WK axis which permits inward pivoting of the grinding spindle 6 on the first grinding headstock 5 and of the grinding spindle on the second grinding headstock 8 with the respectively associated grinding wheel to the bearing point to be ground, in order to grind a cylindrical contour in a highly precise manner or specifically to produce a contour on the bearing point that deviates from the cylindrical contour. The grinding headstocks 5, 8 realize their respective X movements via a guide 22 and their Z movements via corresponding guides 21. The pivot axis WK1 of the first grinding spindle 6 on the first grinding headstock 5 is referred to as WK1 and bears the reference sign 16.1. The pivot axis of the grinding spindle of the second grinding wheel 9 on the second grinding headstock 8 bears the designation WK2 and has the reference sign 16.2. The drives for the Z axis of the grinding headstocks 5, 8 are realized for the first grinding headstock by means of a drive 14 of the Z1 axis, while a drive 15 for the Z2 axis of the second grinding wheel is provided on the second grinding headstock 8. The two drives 14, 16 are preferably designed as master-slave drives.

A longitudinal positioning device 19 is provided on the second grinding headstock 8 and is provided for measuring the lengths or for determining the grinding positions for grinding the flat surfaces on the crankshaft 10.

All axial movements of the grinding machine are movable under CNC control.

A grinding table 2 on which a work headstock 3 is provided with a drive 12 for its C1 axis is located in the front part on the machine bed 1. The work headstock 3 has a work spindle with a chuck 17 which has a tip in addition to clamping jaws. The clamping jaws 17 lie in their clamping position in a compensating manner against the end journal 10.3 of the crankshaft. The clamping jaws 17 act on end sections 10.3 of the crankshaft 10, and the tip engages in a centering bore 10.4 provided in the flat side of the end section 10.3 of the crankshaft 10. The work headstock 3 is preferably movable hydraulically with respect to its positioning, which is indicated by the double arrow on the work spindle of the work headstock 3. By means of this movability, it is possible for the tip 26 (see FIG. 4) to be moved out of the centering bore 10.4 in the crankshaft 10, after the clamping jaws 17 are retracted, in order to load/unload the crankshaft.

A footstock 4 which has a drive 13 for its C2 axis is arranged on that side of the grinding machine which is opposite the work headstock 3. Instead of a footstock, a second work headstock in the manner of the work headstock 3 can also be provided. In the present exemplary embodiment, the footstock 4 is constructed similarly to the work headstock 3 in a mirrored design. The footstock 4 is also preferably movable hydraulically for loading/unloading the crankshaft, which is arranged on the footstock spindle by the double arrow. The footstock 4 has a chuck 18 which has clamping jaws and a centering tip 27 which can be driven therewith and engages in a centering bore 10.4 arranged in the flat side of the end section of the crankshaft. The crankshaft 10 is clamped between the chuck 17 of the work headstock 3 and the chuck 18 of the footstock 4.

The two drive axes C1 of the work headstock 3 and C2 of the footstock 4 are moved as coupled axes, and therefore the C1 and C2 axis are driven synchronously in an electrically CNC-controlled manner. Owing to the synchronous drive of the crankshaft on both crankshaft ends in the clamped state of the crankshaft, the crankshaft is prevented from "twisting on itself" over its length because of torsion in the elastic region of the material. It can thereby be ensured that the crankshaft can be ground with very high precision.

Due to the relatively great length of the crankshaft 10, the latter is supported at a plurality of main bearings, in the present case at four main bearings, by steady rests 11 which, for their part, are fastened on the grinding table 2 and can be moved in such a manner that they can be lined up with a respective main bearing 10.1 and can support the latter after corresponding steady rest seats have been ground on said main bearings.

When the crankshaft 10 has been completely finish-ground and is intended to be unloaded from the grinding machine, the chuck 17 of the work headstock 3 and the chuck 18 of the footstock 4 are retracted while simultaneously disengaging the tips 26, 27 of the respective chucks. In this case, the crankshaft rests on what are referred to as supporting prisms (not illustrated) which are likewise mounted on the grinding table 2 and act on two main bearings 10.1. A crankshaft deposited in this manner can then be removed from the grinding machine with corresponding lifting devices. Similarly, a new crankshaft which has yet to be ground is loaded into the grinding machine by being placed onto said supporting prisms, which is followed by said crankshaft being clamped on its respective end regions by the chucks 17 and 18.

In order to compensate for wear on the CBN grinding wheels 7, 9 that occurs because of a plurality of grinding operations and in order to restore a desired contour on the grinding wheel, the grinding wheels are dressed in wear-induced intervals. For this purpose, a dressing device 20 with a diamond wheel is additionally arranged on the grinding table 2, with which dressing device the geometry of the grinding wheel can be restored with $\mu$m precision by dressing.

The length measurement device 19 additionally arranged on the second grinding headstock 8 has a switching measurement head. Said switching measurement head can be brought into the various measurement positions by moving with the X2 and the Z2 axis of the grinding headstock 8. With said measurement key head, the actual length dimensions are measured, for example, before the actual grinding on the unmachined part and also on the finished crankshaft. However, radial positions can also be measured with said measurement device.

In order to be able to measure the current diameter dimensions continuously during the grinding and also on the finished workpiece, a what is referred to as in-process measurement device is provided. The latter is not illustrated here in FIG. 1 for clarity reasons. Said in-process measurement devices are generally constructed on a grinding headstock 5, 8, wherein normally one in-process measurement device is provided per grinding spindle and grinding wheel. Said measurement device has an additional CNC-controlled axis, and therefore the measurement device is movable along the Z axis independently of the movement of the grinding spindle with its grinding wheel. As a result, it is possible to obtain measurement values of the current diameter at a plurality of desired positions in the longitudinal direction of the main bearings and of the crank pin bearings, for example. Said measurement values are firstly required in order also to monitor the conicity or the ballus of a bearing point during the grinding process and, on the basis of the measurement values, to undertake a corresponding control of the grinding operation of the corresponding grinding wheel. During the grinding, a dimensional correction can therefore be undertaken if required such that the ground desired contour is also achieved. It is therefore possible to realize very high accuracies even for said large crankshafts. This measurement device therefore provides the basis, in conjunction with the additional drives of the pivot axes WK1 and WK2 with the reference sign 16.1 and 16.2, also to undertake a correction during the grinding in order to achieve as exact and desired a lateral surface contour as possible at the respective bearing point.

The grinding of the crankshafts is realized at the bearing points and also on the central portions at the shaft ends by means of grinding wheels with a CBN coating. Use is preferably made for this purpose of ceramically bonded CBN which can also be dressed in the continuing grinding process, in the already described wear-induced intervals. However, for special grinding tasks, grinding wheels with galvanically coated CBN may also be used.

Figure 2:
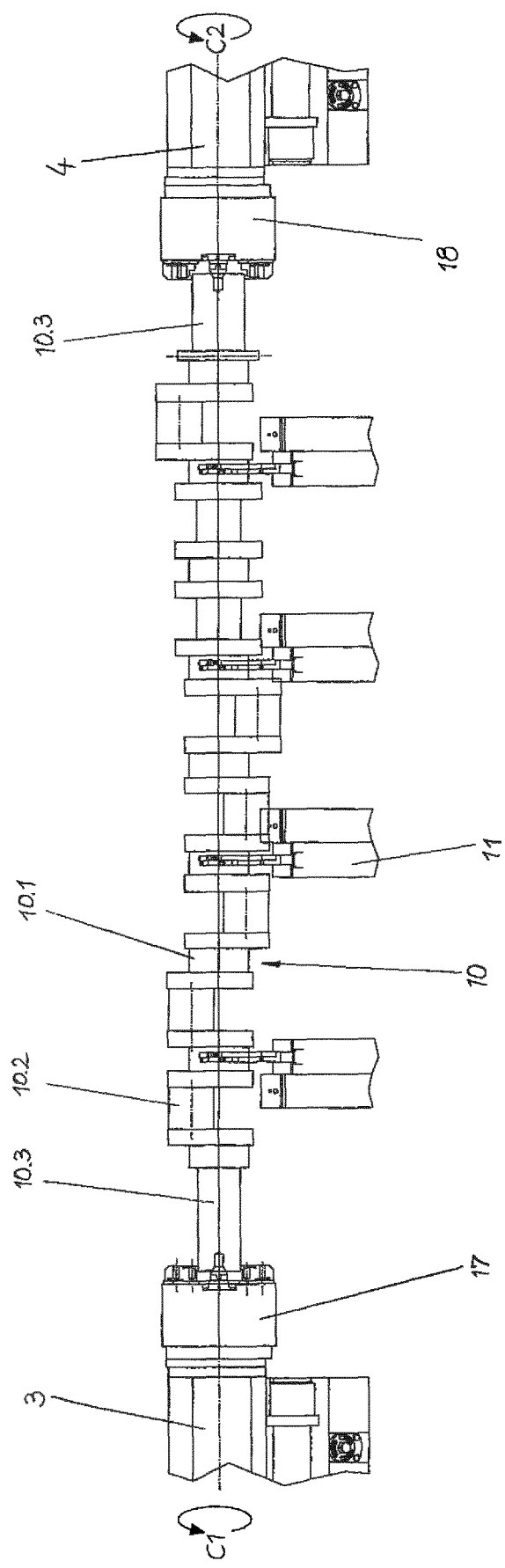
FIG. 2 shows a partial view from FIG. 1 with a top view of the clamped crankshaft.

FIG. 2 illustrates a partial view of FIG. 1, in which the design of the grinding table is illustrated in enlarged form and shows the work headstock 3 with the C1 axis and its chuck 17 and also the footstock 4 with its C2 axis with the associated chuck 18, wherein the work headstock 3 and the footstock 4 keep the crankshaft 10 clamped between their chucks 17, 18. The clamping is realized in such a manner that the center axes of the work headstock 3, of the crankshaft, that is to say the main bearings 10.1 thereof, and of the footstock 4 are exactly aligned with one another. The crankshaft 10 is clamped at the journal 10.3 on its respective end regions with the respective clamping jaws 17.1, 18.1 and tips 26, 27 of the chucks 17, 18. Corresponding crank pin bearings 10.2 of the crankshaft 10 are arranged between each two main bearings 10.1. Steady rests 11 for supporting the crankshaft 10 are lined up with the main bearings 10.1, which constitute central bearing points, and are in engagement with said main bearings at the central bearing points 10.1. The crankshaft 10 is fixedly clamped at its central ends and is driven both by the drive of the C1 axis on the left side and by the drive C2 on the right side in synchronism with each other. The clamping jaws 17.1, 18.1 and the centering tips 26, 27 are designed in such a manner that the compensating clamping jaws 17.1, 18.1 permit concentricity errors or dimensional inaccuracies at the clamping point without having a significant effect on the centering tips 26, 27 in the chuck 17, 18. It is also possible to use centrally clamping chucks instead of chucks 17, 18 with centering tips 26, 27.

FIG. 2 shows the clamping state for grinding the bearing points 10.1, 10.2. During the grinding of the end regions of the crankshaft 10, the clamping states of the crankshaft 10 in the machine have to be changed, which is described in the following figures, but without dispensing with the central clamping of the crankshaft 10. It is therefore possible to be able to grind the main bearings 10.1 and the crank pin bearings 10.2 and also the end regions 10.3 of the crankshaft 10 in a single setup.

Figure 3:
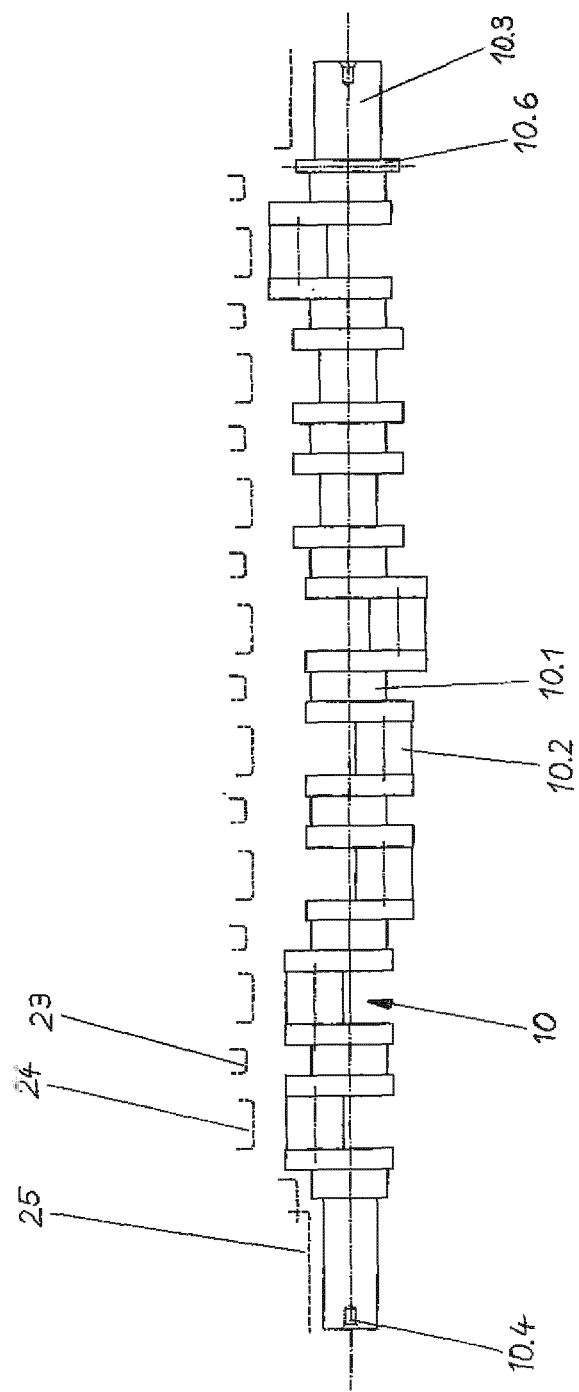
FIG. 3 shows a crankshaft with schematically illustrated grinding regions in order to illustrate the grinding task on the crankshaft.

FIG. 3 shows a simplified illustration of a crankshaft 10, in which indicated grinding regions 23, 24, 25, that is to say the regions which have to be machined on the crankshaft 10 in the sense of complete machining, are shown. This illustration puts together the corresponding grinding tasks, specifically, in the present case, for an 8-cylinder crankshaft of an engine or a 16-cylinder crankshaft of a V engine. On the crankshaft 10, the main bearings 10.1, the crank pin bearings 10.2 and the shaft ends with their end regions in the form of journals 10.3 are to be ground, which takes place in a single machine in one setup without the crankshaft 10 having to be loaded/unloaded in between. The main bearings 10.1 are represented by the grinding region 23 for the main bearings, the crank pin bearings 10.2 by the grinding region 24 for the crank pin bearings, and the cylindrical end regions in the form of journals 10.3 by the grinding region 25 for the journals. Furthermore, the crankshaft has, on the right-hand side, a flange 10.6 which likewise also has to be ground on its flat sides. Furthermore, the crankshaft 10 has, at its end-side ends, centering bores 10.4 which are provided for the purpose of engaging centering tips 26, 27 of the respective chucks 17, 18 and of accommodating the crankshaft 10 in a centering manner.

In the general grinding task, first of all the steady rest seats are rough-ground on the main bearings 10.1 of the crankshaft such that a round, neatly ground steady rest seat is ground. During the further procedure, the further steady rest seats are then ground one after another or else parallel in time until the crankshaft 10 is supported in a stable manner over its length with steady rests 11 lined up with the main bearings 10.1. During the further grinding procedure, the crank pin bearings 10.2 and the main bearings 10.1 are then rough-ground such that all of the bearing points are rough-ground at their diameters, radius transitions and flat sides. After the rough-grinding, the finish-grinding of the crank pin bearings, the main bearings and the shaft ends to the finished size takes place. The rough-grinding and finish-grinding preferably take place with one and the same grinding wheel 7, 9. During the complete grinding of the crankshaft 10, the previously described methods are brought into use in a manner as is technologically advantageous and expedient for the grinding of the corresponding crankshafts, wherein the grinding sequence is dependent on the respective crankshaft and may be completely varied. In general, in the case of large crankshafts, a defined grinding sequence can not be fixedly defined and predetermined since the grinding technology during the grinding is greatly dependent on the processing and the behavior with regard to stresses which are liberated and therefore in conjunction with a possible distortion of the crankshaft. The material of which the crankshaft is composed should be considered to be a further influence on defining the grinding sequence. Even identically pre-machined crankshafts which are composed of different materials or have undergone a differing hardening treatment have to be sometimes machined differently in respect of the grinding procedure, with these properties also being taken into consideration. A further influencing variable in this regard is the natural frequency of the crankshaft, which can likewise result in or require defined grinding sequences.

Figure 4:
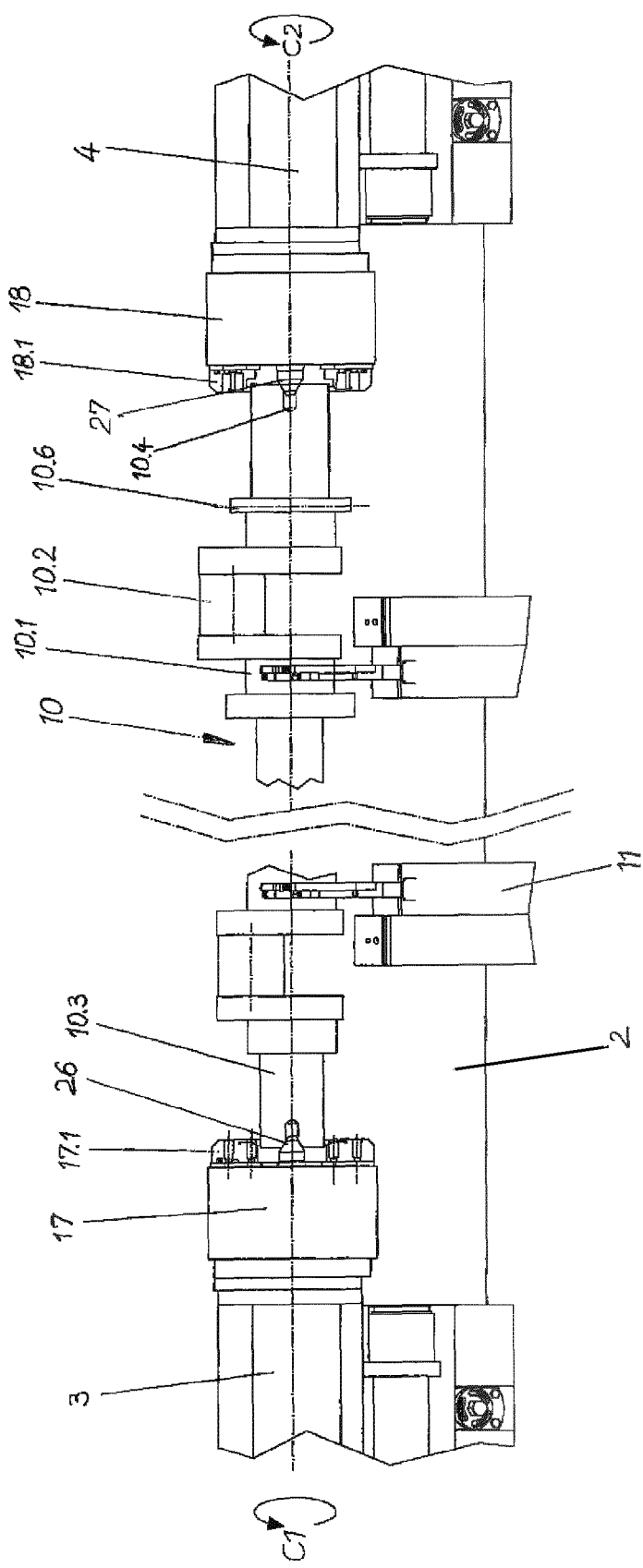
FIG. 4 shows clamping of the crankshaft at its end regions by work headstocks.

FIG. 4 is an enlarged illustration of FIG. 2, wherein the crankshaft 10 is only partially shown. In a supplement to FIG. 2, the chucks 17 of the work headstock 3 with their clamping jaws 17.1 and the centering tip 26, and also the chuck 18 of the footstock 4 with its clamping jaws 18.1 and the centering tip 27 are illustrated here in an enlarged illustration. The centering tips 26, 27 are designed in a manner such that they are driven at the same time, and therefore, when the clamping jaws 17.1 are retracted, the crankshaft continues still to be held and clamped in a centered manner via the centering tips 26, 27. Two steady rests 11 are shown.

Figure 5:
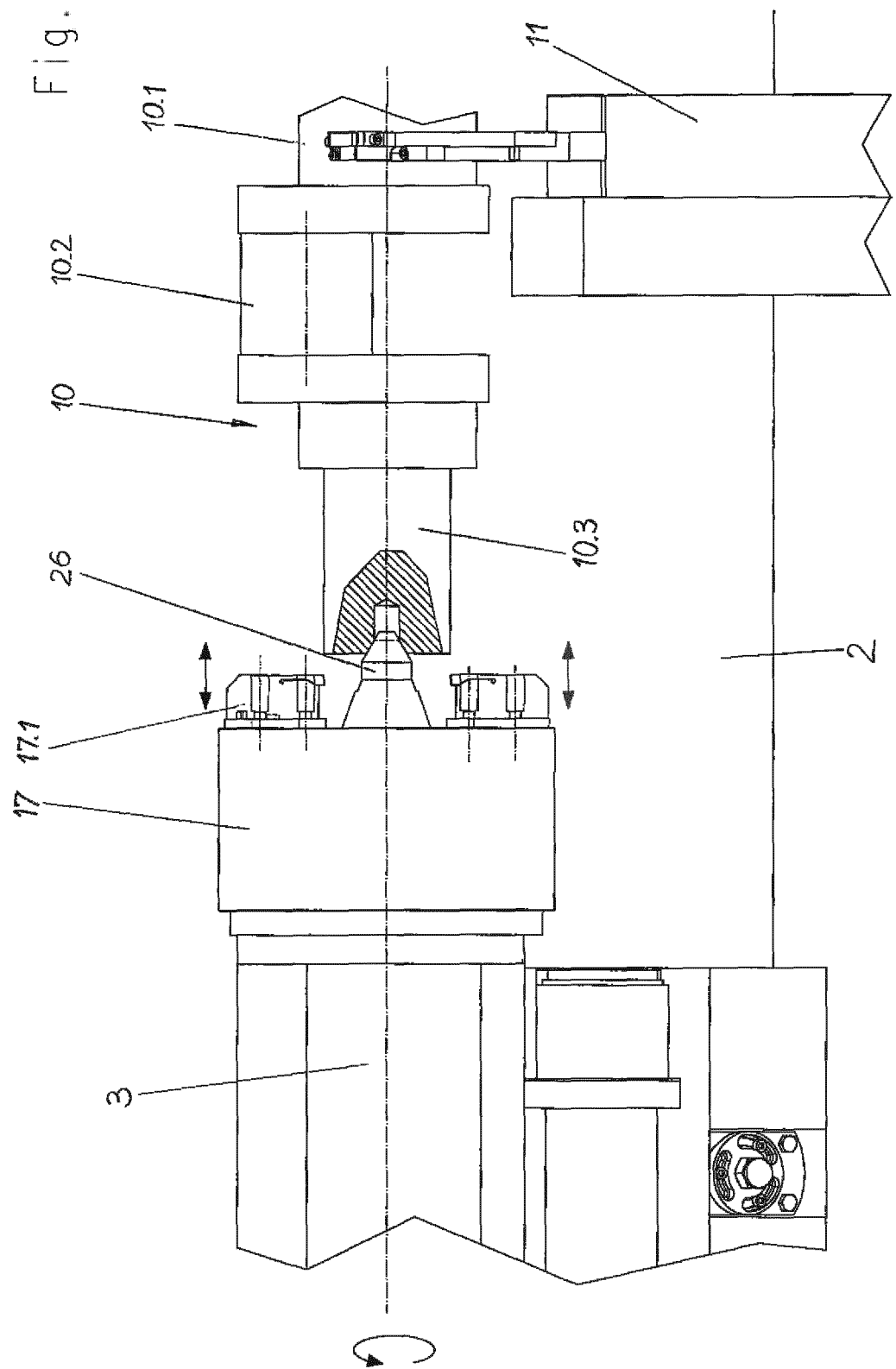
FIG. 5 shows the work headstock with retracted clamping jaws and the centering tip in engagement with the crankshaft in the centering bore thereof.

FIG. 5 shows the chuck 17 on the work headstock side, with open clamping jaws 17.1 which are retracted. The retraction is indicated by the double arrow in each case indicated at the top and bottom. Furthermore, the chuck 17 has the centering tip 26 which, when the clamping jaws are retracted, continues to centrally support or clamp the crankshaft 10 at the journals 10.3 thereof. A steady rest 11 supports the first main bearing 10.1, as seen from the left, after the first crank pin bearing 10.2 of the crankshaft 10, wherein the steady rest 11 is arranged on a holder which is fastened on the grinding table 2.

In the case of the illustrated retracted position of the clamping jaws 17.1, the journals 10.3 of the end regions of the crankshaft 10 and possibly present flat sides can be ground. During the grinding of the left end region, the crankshaft 10 continues to be clamped in the chuck 18 on the footstock 4 (not illustrated), and therefore, in addition to the driven centering tip 26, which realizes the C1 axis, the C2 axis of the footstock 4 drives the crankshaft 10 in a rotatory manner for grinding purposes. Of course, it is also possible not to drive the work spindle at the same time during the grinding of the journal 10.3, and therefore a stationary tip is then present. This depends on the respective grinding task and respective design of the crankshaft to be ground.

Figure 6:
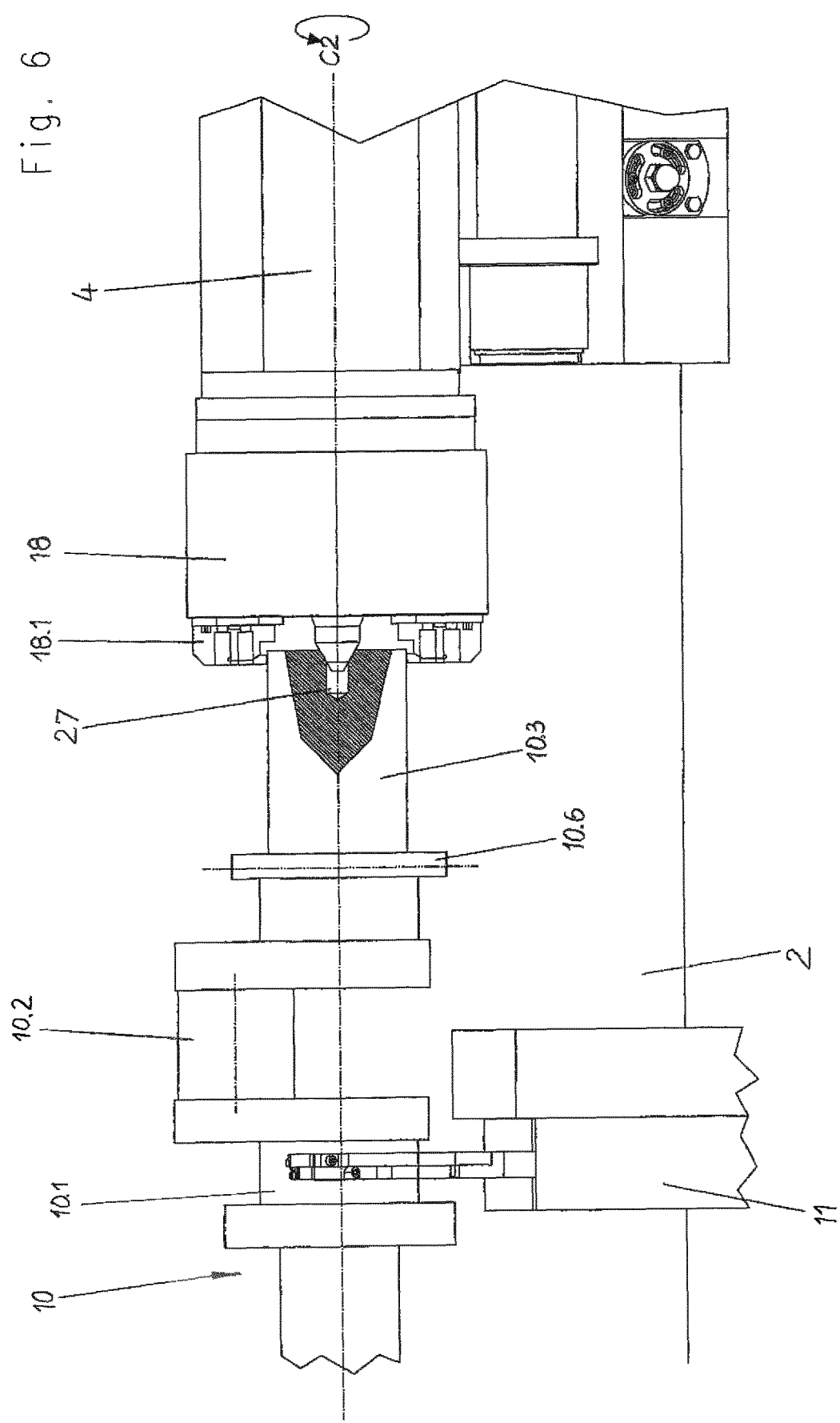
FIG. 6 shows footstock-side clamping of the crankshaft with a closed chuck.

In an enlarged illustration in comparison with FIG. 4, FIG. 6 illustrates the arrangement of the footstock 4 with its drive C2 in the clamped state of the right journal 10.3 of the crankshaft 10. The illustration basically corresponds to the arrangement for the work headstock 3 according to FIG. 5, with the exception that the chuck 18 acts with its clamping jaws 18.1 and the centering tip 27 of the footstock 4 in clamping engagement on the journal 10.3.

Figure 7:
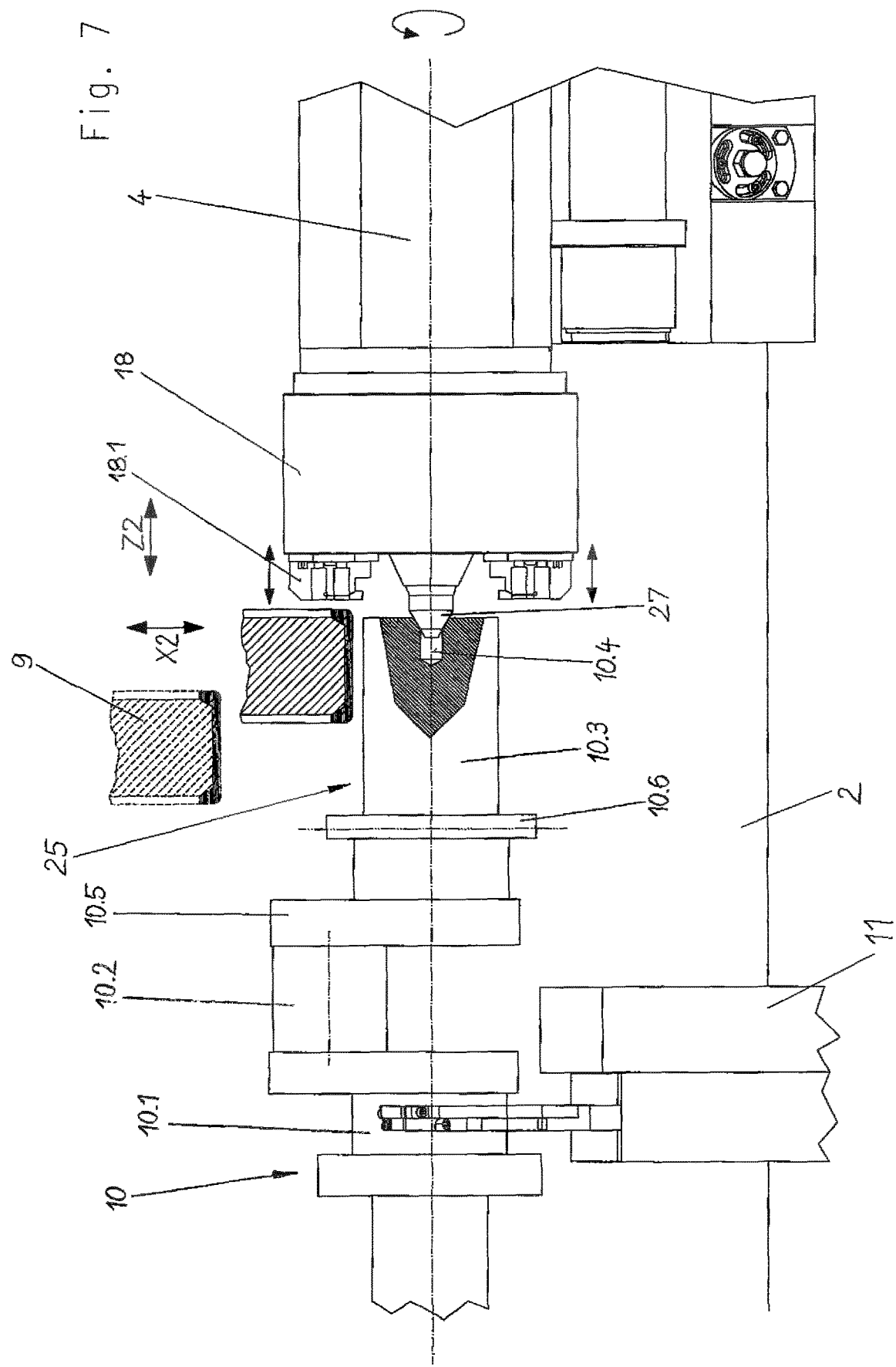
FIG. 7 shows the footstock-side clamping of the crankshaft with the centering tip in engagement in the centering bore and with indicated grinding wheel for carrying out the grinding on the cylindrical end region of the crankshaft.

It is illustrated in FIG. 7 how the cylindrical end region in the form of the journal 10.3 can be ground with respect to the grinding region 25 with the grinding wheel 9. The chuck 18 of the footstock 4 is retracted here with respect to the clamping jaws 18.1, which is identified by the double arrow indicated above and below the chuck 18. As before, the centering tip 27 of the chuck 18 is in engagement with the centering bore 10.4 in the end side of the journal 10.3 of the crankshaft 10. When the clamping jaws 18.1 are retracted, the cylindrical end region in the form of the journal of the crankshaft 10 can be ground in the grinding region 25 by means of the grinding wheel 9, and therefore this region of the crankshaft can be ground with respect to the diameter and optionally also on the existing flat side of the flange 10.6. The grinding of the journal 10.3 can be ground by multiple plunge grinding. After the second plunge-cutting with the grinding wheel 9, the latter is "twisted" over the complete length of the journal such that a completely cylindrical diameter arises on the finished part. Not illustrated is the left side of the crankshaft 10 with the work headstock 3 which is arranged there and the chuck 17 of which continues to keep the crankshaft 10 clamped such that the C1 axis drive of the work headstock 3 drives the crankshaft 10 in a rotatory manner for grinding purposes. The centering tip 27 on the footstock 4 is expediently likewise driven during this machining, and therefore a co-rotating tip is present on the footstock side. However, it is likewise possible for the footstock spindle not to be driven during this part of the grinding, and therefore a stationary or simply co-rotating tip is present.

Figure 8:
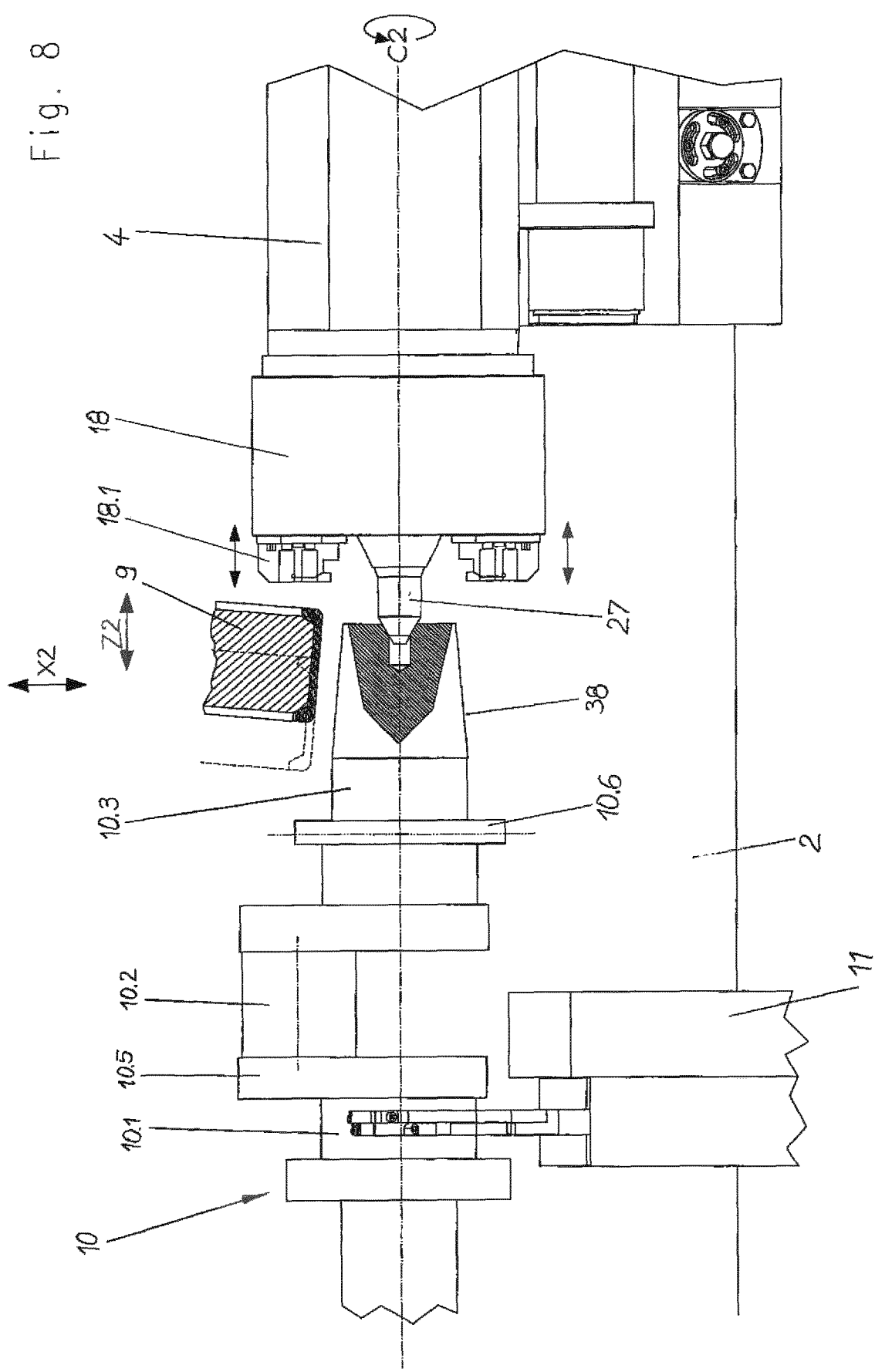
FIG. 8 shows an illustration according to FIG. 7, but with a conical end region on the cylindrical end part of the crankshaft and with grinding wheel indicated.

FIG. 8 shows an illustration corresponding to FIG. 7, but with the difference that, at the end of the crankshaft 10, it is not a cylindrical section, but rather a cylindrical section with an end-side cone 38 located thereon which is ground. The grinding wheel 9 is pivoted in here via the WK pivot axis; in the present case, via the WK2 pivot axis 16.2. During the grinding of the cone 38, the grinding wheel 9 is moved along the lateral surface line of the cone 38, i.e. the X2 and Z2 axes are activated in an interpolating manner, and therefore the grinding wheel 9 is moved in a manner corresponding to a combination of movement of the X axis and the Z axis.

Figure 9:
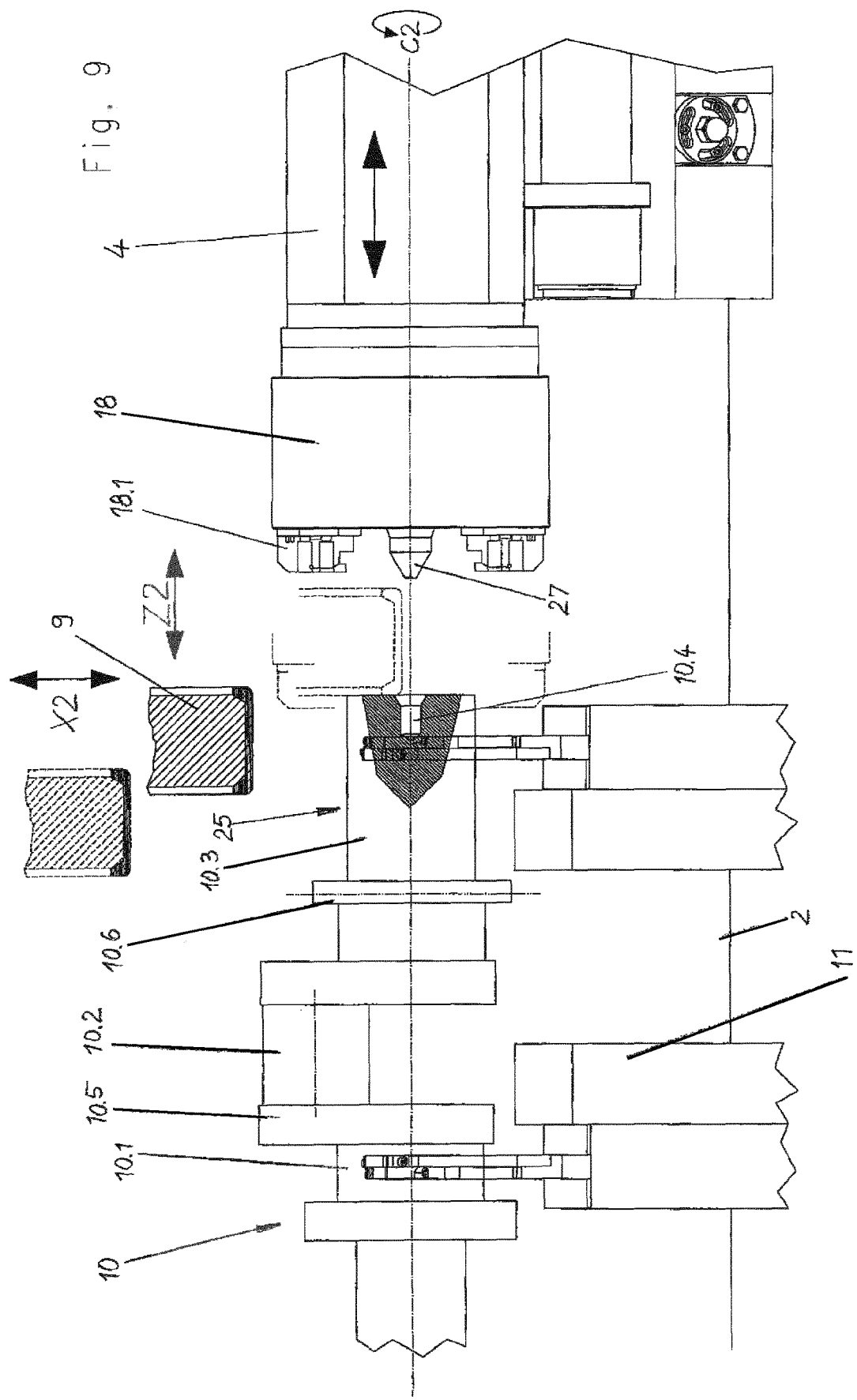
FIG. 9 shows an illustration with the chuck completely retracted on the footstock and with additional steady rest support on the cylindrical end region of the crankshaft for the purpose of grinding the end side of the cylindrical end region.

FIG. 9 illustrates a further exemplary embodiment as to how the complete machining of a large crankshaft can also be ground on the end sides of its end-side cylindrical journals 10.3. The basic arrangement corresponds to that shown in FIG. 7, wherein the footstock 4 with its chuck 18 having the clamping jaws 18.1 and the centering tip 27 is retracted as a whole from engagement with the crankshaft 10, which is identified by the thick double arrow on the footstock 4. So that, as illustrated in FIG. 9, the grinding wheel 9 can grind the end side of the journal 10.3, the footstock 4 has to be retracted until a sufficiently large distance is made possible between the chuck 18 and that end side of the journal 10.3 of the crankshaft 10 that has the centering bore 10.4. For the grinding of said end side, an additional steady rest 11 is lined up, said steady rest being lined up with the journal 10.3, and therefore the journal 10.3 on the crankshaft 10 can be ground without deviating from the center line. During the flat grinding, the grinding wheel 9 is moved along its X2 axis from the outer circumference of the journal 10.3 as far as the center longitudinal axis of the crankshaft. The magnitude of the grinding abrasion is realized via the displacement of the grinding wheel 9 over its Z2 axis. In the manner of operation illustrated according to FIG. 9, it is therefore possible for the complete machining of the crankshaft 10 to also comprise the end sides of the end journals 10.3 of the crankshaft. On the work headstock 3, the chuck 17 remains in engagement both with respect to the clamping jaws 17.1 and the centering tip 26 with the left-side journal, and therefore the C1 axis drive of the work headstock 3 drives the crankshaft 10 in a rotatory manner for grinding purposes.

Figure 10:
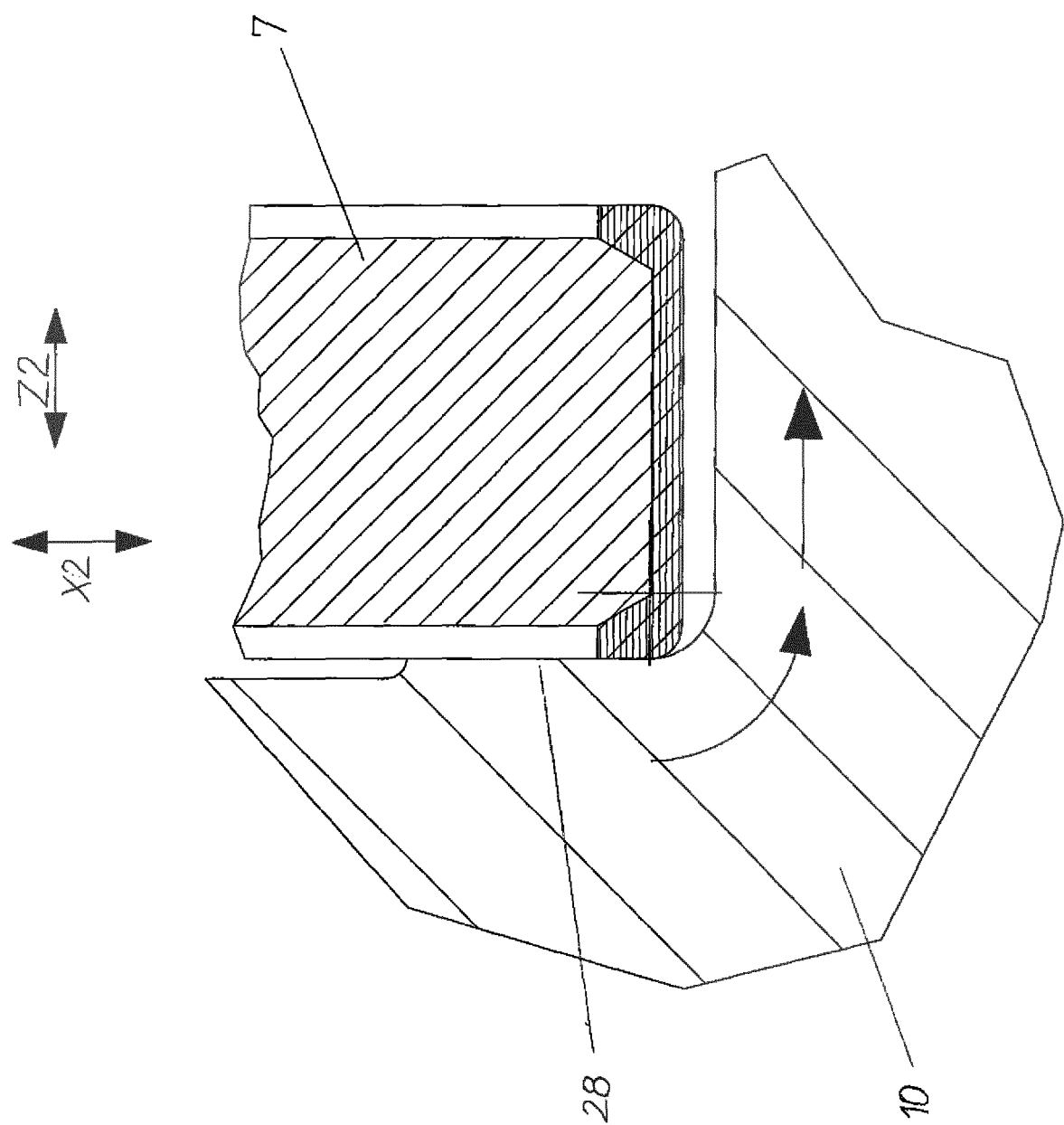
FIG. 10 shows an illustration of the copying by means of a CBN grinding wheel in the event of different transition radii at the bearing points between direct bearing region and flat sides.

FIG. 10 schematically illustrates how, at a bearing point, a transition radius from the actual bearing point is "replicated" during the grinding by means of the grinding wheel 7, 9 by interpolation of the movements, i.e. the drives of the X and Z axis. The movement of the grinding wheel 7, 9 along the transition radius to be ground is indicated by the two arrows in the region below the grinding wheel 7, 9. This method makes it possible to be able to grind bearing points with different "corner radii" with one and the same CBN grinding wheel.

The flat side 28 bounding the actual bearing point can also be ground with one and the same grinding wheel 7, 9. It can furthermore be required here that, in the case of grinding a flat side 28 which is oriented perpendicularly to the longitudinal axis of the bearing point and therefore of the crankshaft 10, the grinding wheel 7, 9 is slightly pivoted in about its WK pivot axis 16.1 or 16.2 such that the flat side 28 can be reliably ground at any desired angle to the longitudinal axis of the bearing.

This method or the grinding machine for realizing the method can also be used in the case of correspondingly contoured diameter transitions on the end regions of the crankshaft.

FIG. 11 shows how, with the additional movement about the WK1 or WK2 axis of the grinding wheel 7, 9, a convex contour, for example, can be produced at a bearing point without the grinding wheel having to be concavely dressed on its lateral surface. The advantage of the additional drives for the WK1 and WK2 pivot axis resides especially also in that, with a cylindrical design of the outer lateral surface of the grinding wheel, a "flat" lateral surface is also referred to, and a convex shape can be produced by, for example, periodic pivoting of the grinding wheel 7, 9 about its respective WK axis. This simplifies the dressing operation, and this also increases the flexibility of the use of the grinding machine according to the invention for any desired contours at the bearing points or on the end regions, either in a departure from a cylindrical contour or in a correcting manner in order to achieve a cylindrical contour with high cylindricity. With an arrangement of this type, it is possible to grind different convexities at the bearing points of the crank pin bearings 10.2 or of the main bearings 10.1 with the same grinding wheel.

In the left part of FIG. 11, the perpendicular supply of the grinding wheel 7, 9 along its X1 or X2 axis is illustrated, specifically during the "plunge grinding". In the case of large crankshafts, as also insignificantly indicated in FIG. 11, the width of the grinding wheel 7, 9 is smaller than the length of the bearing between the lateral flat surfaces bounding said bearing. Frequently, a purely cylindrical bearing surface is therefore ground in such a manner that, initially during the rough-grinding, a rough-grinding contour is achieved in a plurality of plunge grinding operations adjoining one another. The small oversize with respect to the finish-grinding that remains after the rough-grinding is then abraded by lateral twisting, which also includes smoothing of the surface, over the length of the bearing.

If the width of the grinding wheel 7, 9 is smaller than the length of the bearing point, it is possible, with the method according to the invention and the grinding machine according to the invention, to realize a pivoting movement about the WK1 or WK2 axis such that, as shown in the right part of the figure, a bearing point with a convex contour is produced. If the grinding wheel is pivoted to the right about its WK1 or WK2 axis, the contour shown by dashed lines is the maximum contour to which the grinding wheel 7, 9 can be pivoted without encountering the previously ground flat sides. During the production of convex bearing points, because of the required pivoting of the grinding wheel about the WK axis, a possibly present slight distortion at the transition radius from the actual bearing point to the flat side should be anticipated, wherein said distortion, however, lies within the permissible tolerance range since the convexity of the bearing point contour is in any case formed only in the micrometer range.

The advantage of the non-profiled grinding wheel consists specifically also in that what is referred to as the flat lateral surface of the grinding wheel 7, 9 can easily be used both for producing a convex structure of a bearing surface and also of cylindrical bearing points or cylindrical journals at the shaft ends of the crankshaft.

Figure 12:
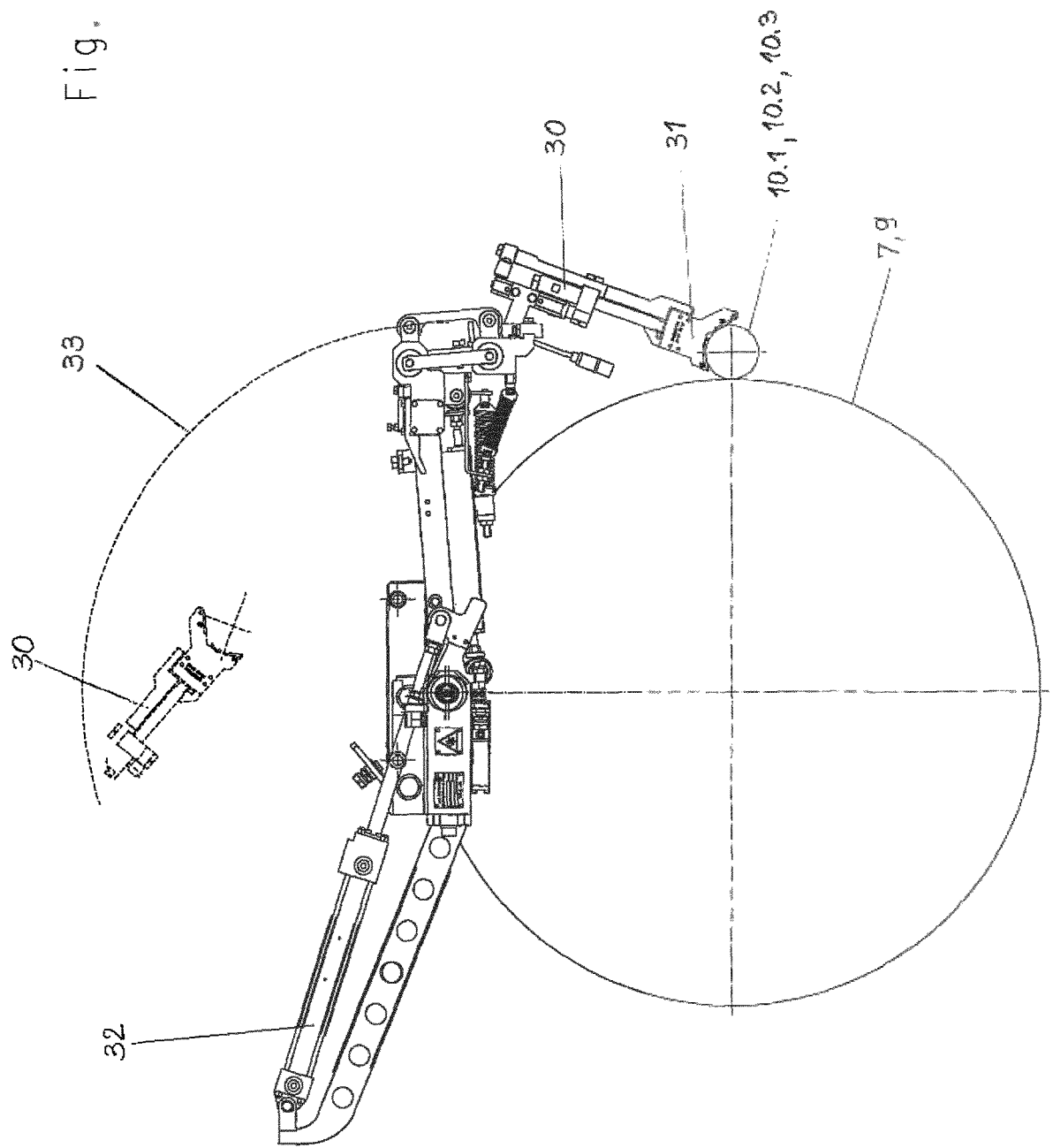
FIG. 12 shows a schematic arrangement of an in-process measurement device for measuring the current diameters at bearing points.

FIG. 12 illustrates a measurement device 30 which is arranged in a manner such that it can be pivoted in on the grinding headstock 5, 8. The measurement device 30 is pivoted via a pivoting curve 33 out of the grinding machine by means of hydraulic cylinders 32 into a free position outside the grinding wheel for the purpose of loading/unloading the crankshaft 10. The pivoting curve 33 is illustrated as a dashed line. The measurement device 30 is usable both for main bearings 10.1 and for crank pin bearings 10.2 and, at its front end, has a measurement prism 31 which can be pivoted onto a bearing point 10.1/10.2. Owing to the fact that the measurement device 30 can be pivoted laterally onto a respective bearing point 10.1 or 10.2, a measurement of the corresponding diameter at the bearing point can be carried out during the grinding with the grinding wheel 7, 9. Since, in the case of large crankshafts, the width of the grinding wheel 7, 9 is smaller than the length of the respective bearing point, the grinding wheel also has to be brought into different grinding positions in its Z direction for grinding purposes. In order to achieve a high degree of accuracy of the bearing point to be ground, which is also intended to include the measurement of a contour differing from a cylindrical outer contour, it is provided according to the invention that the measurement device 30 is movable in one direction by means of an additional dedicated CNC-controlled axis and can be lined up at a plurality of different locations with a bearing point which runs parallel to the longitudinal axis of the crankshaft. With the measurement device which is present, a post-process measurement can also be undertaken at the bearing points.

If grinding is not carried out with the grinding wheel 7, 9, such as, for example, during the loading or unloading, the measurement device is pivoted out of the working region of the grinding wheel 7, 9. The crankshaft 10 always remains clamped in the machine during the measurement.

It is illustrated in FIG. 13, according to a further exemplary embodiment, how cooling nozzles 35 are carried along during the grinding of the eccentrically revolving crank pin bearing in such a manner that the distance of said cooling nozzles from the grinding wheel engagement point remains approximately the same. FIG. 13A shows how the grinding wheel 7, 9 is brought along its direction of rotation 34 and along its infeed direction X into engagement with a crank pin bearing journal 10.2. The rotation of the crankshaft 10 is shown by the dashed arrow indicated in the right part of component drawing A. The solid curved double arrow 36 shows the movement of a cooling nozzle 35 with a dedicated CNC movement axis. The main bearings 10.1 are not ground here. FIG. 13B shows how the crankshaft 10 is rotated through 90° in relation to FIG. 13A, wherein the grinding wheel 7, 9, by means of its movement along the X axis, follows the crank pin journal 10.2. The cooling nozzles 35 are equally carried along by a movement along the CNC cooling nozzle axis. FIG. 13C shows the movement of the crank pin journal 10.2 in a manner rotated by 180° in relation to FIG. 13A, wherein it is also apparent here that the cooling nozzles 35 are virtually at the same distance from the direct grinding engagement point of the grinding wheel 7, 9 on the crank pin journal 10.2. And finally, FIG. 13D shows the case in which the crankshaft is rotated through 270° in relation to the starting point according to FIG. 13A, wherein the cooling nozzles 35 are likewise carried along and are an identically sized distance from the grinding engagement point. The grinding wheel 7, 9 executes this grinding movement in what is referred to as pin chasing grinding, wherein the cooling nozzles 35 carried along via the CNC cooling nozzle axis ensure reliable and optimum cooling of the grinding engagement point of the grinding wheel 7, 9 on the crank pin journal 10.2 to be ground.

If, as is shown in FIG. 14, a main bearing 10.1 of a crankshaft 10 is ground, it is, of course, not required to activate the CNC cooling nozzle axis. On the contrary, the cooling nozzles 35 may be arranged in a fixed manner, and therefore, when the crankshaft 10 is correspondingly rotated, the cooling nozzles 35 are nevertheless at a constant distance from the grinding engagement point of the grinding wheel 7, 9 on the main bearing journal 10.1. The direction of rotation 34 of the grinding wheel and the infeed of the latter along the X axis are likewise shown.

With the grinding machine according to the invention, a high degree of flexibility in the grinding machining of large crankshafts of very different design, very different material and very different requirements is therefore possible, specifically while maintaining high machining quality.

The invention claimed is:

1. A method for completely grinding large crankshafts of truck engines, ship engines or stationary engines comprising
   a) rough-grinding and finish-grinding at least main bearings and crank pin bearings of the crankshaft with at least one first cubic boron nitride grinding wheel with CNC-controlled drives of a first axis (X1) and a second axis (Z1), and a further CNC-controlled drive for a first pivot axis (WK1);
   b) at least two end regions of the crankshaft are rough-ground and finish-ground;
   c) all of the rough-grinding and finish-grinding take place in a single setup of the crankshaft;
   d) the main bearings of the crankshaft including steady rest seats are rough-ground;
   e) one steady rest is lined up with each of the ground steady rest seats;
   f) the crankshaft is driven at two clamping ends by means of first and second electric drives (C1 and C2) operating synchronously to each other;
   g) a desired shape of a lateral surface of the crank pin bearings or main bearings is produced by movement of the first grinding wheel with the CNC-controlled axis drives:
      the first axis bringing about an infeed of the first grinding wheel perpendicularly to a longitudinal axis of the main bearings or crank pin bearings,
      the second axis bringing about a movement of the first grinding wheel parallel to the longitudinal axis of the main bearings or crank pin bearings, and
      the first pivot axis constituting a pivot axis of the first grinding wheel, said first pivot axis running through the grinding wheel and an engagement point of the grinding wheel with a longitudinal axis of the crankshaft, wherein the first grinding wheel has a width which is smaller than an axial length of the main bearings or the crank pin bearings of the crankshaft;
   h) pivoting a measurement device onto at least one bearing of the main bearings or crank pin bearings, in a measurement operation performed during grinding, measuring a first current diameter of the at least one bearing at a first measurement location, moving the measurement device independently from the grinding wheel and parallel to the longitudinal axis of the at least one bearing via an additional dedicated CNC-controlled drive, and measuring at least a second current diameter of the at least one bearing at a second measurement location, the first and second measurement locations spaced apart from each other along the axial length of said at least one bearing, wherein the first and second axes of the first grinding wheel and further the first pivot axis of the first grinding wheel are controlled based on the first and second current diameters measured in the measurement operation in order to obtain a desired contour of the lateral surface said at least one bearing, including a contour differing from a cylindrical outer contour.

2. The method as claimed in claim 1, in which the first axis, second axis, and first pivot axis of the first grinding wheel are controlled in such a manner that a desired shape of the main bearings or crank pin bearings is produced differing from a cylinder.

3. The method as claimed in claim 1, in which length dimensions of the crankshaft are measured and, in order to control a grinding position at least of the first grinding wheel, are transmitted to the CNC controller thereof for the first and second axis.

4. The method as claimed in claim 1, in which, for the grinding of one of the end regions of the crankshaft, a chuck on a work headstock, on a footstock, or on a second work headstock of said end region is released, and the crankshaft is held centrally by a tip of the chuck.

5. The method as claimed in claim 1, in which, for the grinding of one of the end regions of the crankshaft, a chuck on a work headstock, on a footstock, or a second work headstock of said end region is released, and the crankshaft is held by an additional steady rest.

6. The method as claimed in claim 1, in which a second cubic boron nitride grinding wheel executes the rough-grinding and finish-grinding of the crankshaft by means of CNC-controlled additional first (X2) axis and additional second (Z2) axis drives and an additional CNC-controlled second pivot axis drive.

7. The method as claimed in claim 6, in which at least one of the end regions of the crankshaft is ground with the second grinding wheel.

8. The method as claimed in claim 6, in which radii of a lateral surface contour of the crankshaft are ground and the first or second cubic boron nitride grinding wheel is dressed to the radii of the lateral surface.

9. The method as claimed in claim 1, in which at least four steady rest seats are ground.

10. The method as claimed in claim 1, in which at least one of the end regions of the crankshaft is ground with the first grinding wheel.

11. The method as claimed in claim 1, in which at least the first grinding wheel is dressed at defined intervals between the grinding machining of the crankshaft.

12. A grinding machine for completely machining large crankshafts of truck engines, ship engines or stationary engines, comprising a machine bed, which has the following arranged on said machine bed:
   a) a first work headstock and a second work headstock which are each arranged on a grinding table and have respective CNC-controlled first and second rotary drives (C1 and C2), wherein the crankshaft to be ground is clamped between the work headstocks and the first and second rotary drives drive the crankshaft in a rotatory manner at two ends synchronously with respect to each other;
   b) a first grinding headstock with at least one first cubic boron nitride grinding wheel with CNC-controlled drives of a first axis (X1) bringing about an infeed of the first grinding wheel perpendicularly to a longitudinal axis of a main bearing or crank pin bearing and a second axis (Z1) bringing about a movement of the first grinding wheel parallel to said longitudinal axis of the main bearing or crank pin bearing, for rough-grinding and finish-grinding at least one of the main bearings and crank pin bearings of the crankshaft, wherein the first grinding wheel has a further CNC-controlled drive for a first pivot axis (WK1) constituting a pivot axis of the first grinding wheel, said first pivot axis running through the grinding wheel and an engagement point of the grinding wheel with a longitudinal axis of the crankshaft, and the first axis, second axis and first pivot axis are controllable dependently on one another in such a manner that a desired lateral surface contour of the at least one of the main bearings and crank pin bearings can be achieved;

c) steady rests which are arranged on respective bearings and are movable up to a respective crankshaft main bearing in a manner contacting the latter, and in which a steady rest seat has been ground with the first grinding wheel; and d) a measurement device which is arranged at least on the first grinding headstock and having an additional dedicated CNC-controlled displacement axis drive which runs parallel to the longitudinal axis of the main bearings or the crank pin bearing, the additional dedicated CNC-controlled displacement axis drive being adapted to move the measurement device independently from the movement of the grinding wheel along the second axis and configured to perform a measurement operation during grinding including measuring a first current diameter of at least one bearing of the main bearings or crank pin bearings at a first measurement location, moving the measurement device independently from the grinding wheel and parallel to the longitudinal axis of the at least one bearing via the additional dedicated CNC-controlled displacement axis drive, and measuring at least a second current diameter of the at least one bearing at a second measurement location spaced apart from the first measurement location along an axial length of the at least one bearing, wherein the first and second axes of the first grinding wheel and further the first pivot axis of the first grinding wheel are configured to be controlled based on the first and second current diameters measured in the measurement operation in order to achieve the desired lateral surface contour, including a contour differing from a cylindrical outer contour, in the at least one bearing.

13. The grinding machine as claimed in claim 12, in which the first and second rotary drives are electrically synchronizable electric motors.

14. The grinding machine as claimed in claim 12, in which the work headstocks are movable hydraulically.

15. The grinding machine as claimed in claim 12, further comprising a second grinding headstock provided with a second cubic boron nitride grinding wheel and with a CNC-controlled additional first (X2) axis and additional second (Z2) axis for rough-grinding and finish-grinding.

16. The grinding machine as claimed in claim 15, in which a dressing device having a diamond dressing wheel is arranged on the grinding table, by means of which dressing device the first grinding wheel and the second grinding wheel can be dressed to respective desired grinding wheel contours.

17. The grinding machine as claimed in claim 15, in which a length measurement device is arranged on the first grinding headstock or on the second grinding headstock, which length measurement device is movable into different measurement positions along the second axis of the first grinding headstock or additional second axis of the second grinding headstock and by means of which the first grinding wheel or the second grinding wheel is controllable at a grinding location on the crankshaft.

18. The grinding machine as claimed in claim 17, in which the length measurement device has a switching measurement head.

19. The grinding machine as claimed in claim 15, in which the second grinding wheel has an additional CNC-controlled drive for a second pivot axis (WK2).

20. The grinding machine as claimed in claim 12, in which at least four steady rests are provided.

21. The grinding machine as claimed in claim 12, in which the first and second rotary drives are configured to remain in a position clamping the crankshaft during the rough-grinding and finish-grinding of the main bearings and crank pin bearings.

22. The grinding machine as claimed in claim 12, in which cooling nozzles for supplying cooling lubricant are provided with an additional CNC drive for guiding the cooling nozzles during grinding of crank pin bearings with respect to an eccentrically moving grinding location, said cooling nozzles are configured to be moved such that they remain in a substantially equidistant arrangement to a grinding location, which moves eccentrically during rotation of the crankshaft.

23. A method for completely grinding large crankshafts of truck engines, ship engines or stationary engines comprising a) rough-grinding and finish-grinding at least main bearings and crank pin bearings of the crankshaft with at least one first cubic boron nitride grinding wheel with CNC-controlled drives of a first axis (X1) and a second axis (Z1), and a further CNC-controlled drive for a first pivot axis (WK1);

b) at least two end regions of the crankshaft are rough-ground and finish-ground;

c) all of the rough-grinding and finish-grinding take place in a single setup of the crankshaft;

d) the main bearings of the crankshaft including steady rest seats are rough-ground;

e) one steady rest is lined up with each of the ground steady rest seats;

f) the crankshaft is driven at two clamping ends by means of first and second electric drives (C1 and C2) operating synchronously to each other;

g) a desired shape of a lateral surface of the crank pin bearings or main bearings is produced by movement of the first grinding wheel with the CNC-controlled axis drives:

the first axis bringing about an infeed of the first grinding wheel perpendicularly to a longitudinal axis of the main bearings or crank pin bearings, the second axis bringing about a movement of the first grinding wheel parallel to the longitudinal axis of the main bearings or crank pin bearings, and the first pivot axis constituting a pivot axis of the first grinding wheel, said first pivot axis running through the grinding wheel and an engagement point of the grinding wheel with a longitudinal axis of the crankshaft, wherein the first grinding wheel has a width which is smaller than an axial length of the main bearings or the crank pin bearings of the crankshaft;

h) pivoting a measurement device onto at least one bearing of the main bearings or crank pin bearings, in a measurement operation performed during grinding, measuring a first current diameter of the at least one bearing at a first measurement location, moving the measurement device independently from the grinding wheel and parallel to the longitudinal axis of the at least one bearing via an additional dedicated CNC-controlled drive, and measuring at least a second current diameter of the at least one bearing at a second measurement location, the first and second measurement locations spaced apart from each other along the axial length of said at least one bearing, wherein the first and second axes of the first grinding wheel and further the first pivot axis of the first grinding wheel are controlled based on the first and second current diameters measured in the measurement operation in order to obtain a desired contour of the lateral surface of said at least one including a cylindrical shape.

24. The method as claimed in claim 23, in which the first axis, second axis, and first pivot axis of the first grinding wheel are controlled in such a manner that a cylindrical shape of the main bearings or crank pin bearings is produced.

* * * * *